United States Patent [19]
Horton

[11] Patent Number: 5,706,765
[45] Date of Patent: Jan. 13, 1998

[54] METHOD AND APPARATUS FOR COOPING CHICKENS

[75] Inventor: Herbert D. Horton, Nacogdoches, Tex.

[73] Assignee: The Taylor Group, Inc., Louisville, Miss.

[21] Appl. No.: 604,886

[22] Filed: Feb. 22, 1996

Related U.S. Application Data

[63] Continuation-in-part of Ser. No. 342,493, Nov. 21, 1994, Pat. No. 5,592,902.

[51] Int. Cl.$^6$ .................................................. A01K 29/00
[52] U.S. Cl. ................................................... 119/846
[58] Field of Search ................................. 119/843–849

[56] References Cited

U.S. PATENT DOCUMENTS

| | | | |
|---|---|---|---|
| 3,672,335 | 6/1972 | Sanders | 119/82 |
| 4,074,658 | 2/1978 | Mermelstein et al. | 119/846 |
| 4,301,769 | 11/1981 | Mola | 119/82 |
| 4,467,745 | 8/1984 | Ledwell et al. | 119/82 |
| 4,508,062 | 4/1985 | Berry et al. | 119/82 |
| 4,513,689 | 4/1985 | Berry et al. | 119/82 |
| 4,567,852 | 2/1986 | Ledwell et al. | 119/82 |
| 4,569,308 | 2/1986 | O'Neill et al. | 119/82 |
| 4,600,351 | 7/1986 | Nelson | 119/82 |
| 4,669,423 | 6/1987 | van der Bane | 119/846 |
| 4,766,850 | 8/1988 | O'Neill | 119/82 |
| 4,900,292 | 2/1990 | Berry et al. | 474/84 |
| 5,259,811 | 11/1993 | Berry | 452/183 |
| 5,325,820 | 7/1994 | Briggs et al. | 119/846 |
| 5,385,117 | 1/1995 | Hollis et al. | 119/846 |
| 5,592,902 | 1/1997 | Horton | 119/846 |

*Primary Examiner*—Thomas Price
*Attorney, Agent, or Firm*—Walker, McKenzie & Walker, P.C.

[57] ABSTRACT

A cooping apparatus by which a large number of chickens, such as may be found growing within a chicken house, are mechanically transferred into a multi-tiered coop. A conveyor is supported along the length of a boom, and a chicken gathering apparatus is supported from the depending end of the boom for gathering the chickens onto the boom conveyor, which moves then onto an elevated intermediate conveyor system. Overlying the conveyor system is a pivotally mounted set of distribution vanes that uniformly distributes the chickens as they continue to move along the conveyor system towards the receiving end of a transfer divider. The transfer divider divides the chickens into a plurality of horizontal parallel paths, each path leading into the compartments of one tier of a multi-tiered coop that is supported on the rear of the machine. An elevator device sequentially positions the discharge from the transfer divider respective to each of the tiers of the coop being loaded so that the chickens are discharged from the divider, where they move along the horizontal parallel paths, into appropriate compartments of a selected tier of the coop. The loaded and empty coops automatically are moved into a position convenient for a forklift vehicle to engage and remove from the cooping apparatus. A modified apparatus shows among other things a loading conveyor at the loading area and deflectors for successively deflecting the chickens into the various compartments of the various tiers of the chicken coops.

8 Claims, 23 Drawing Sheets

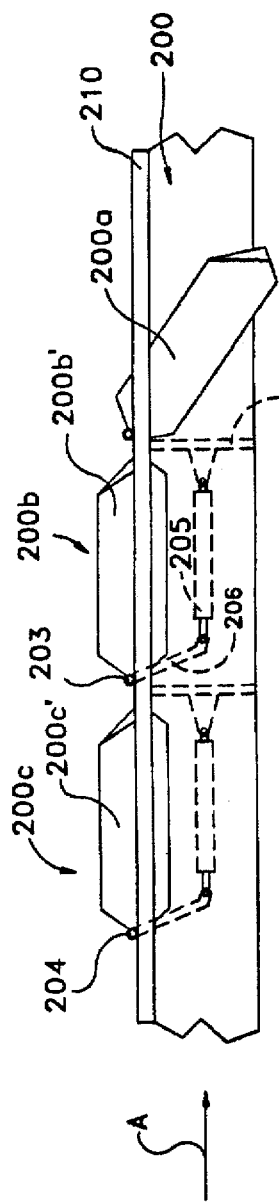
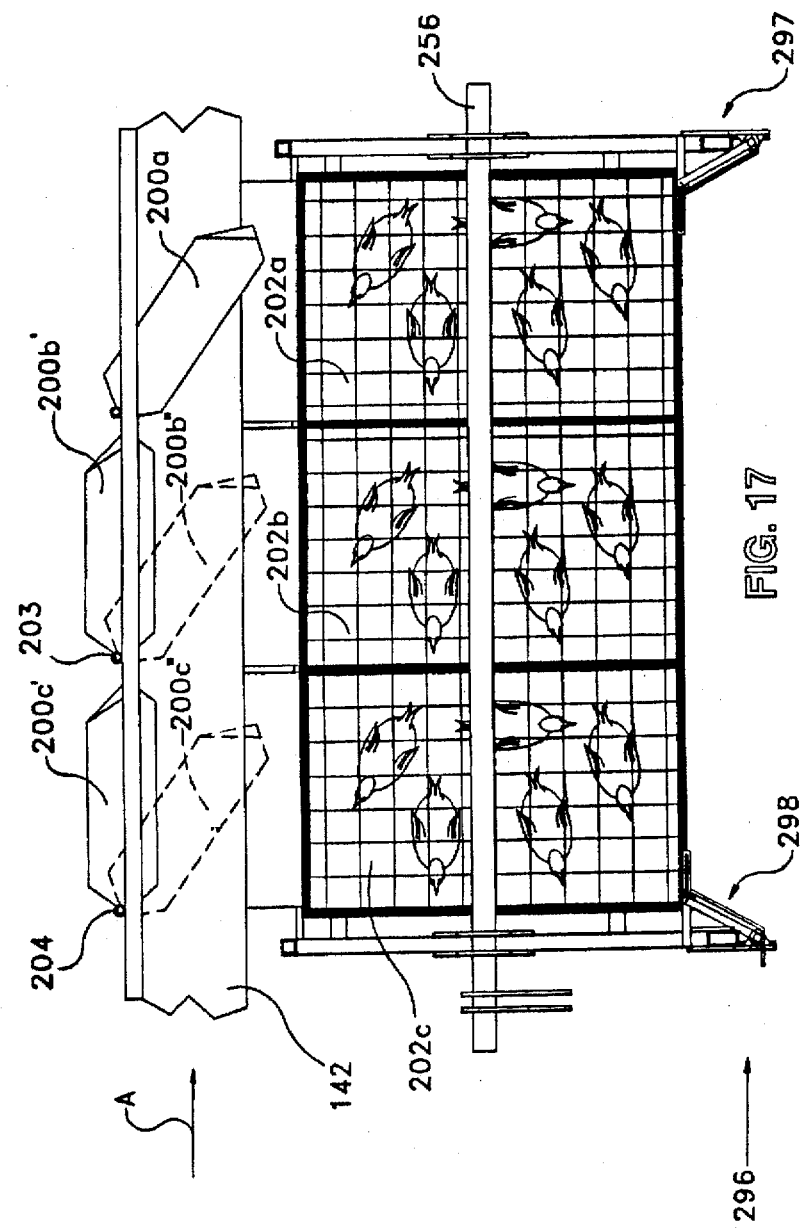

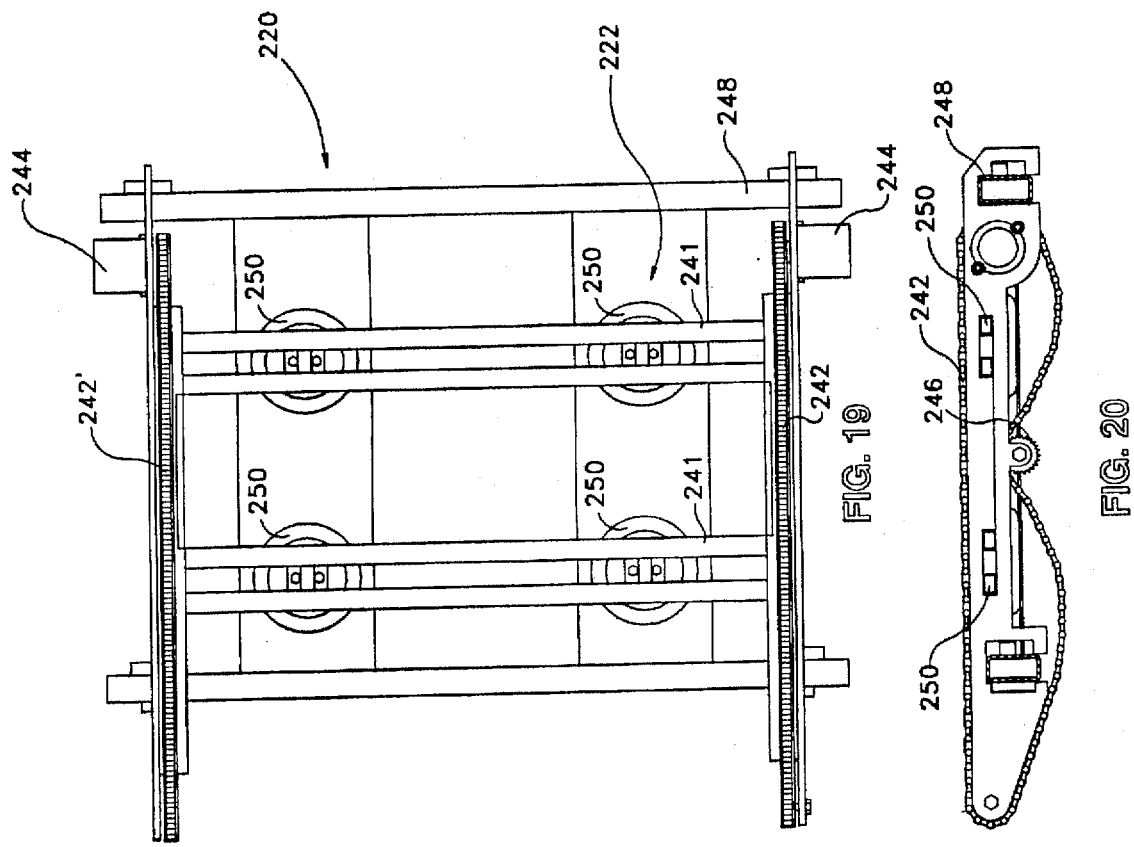

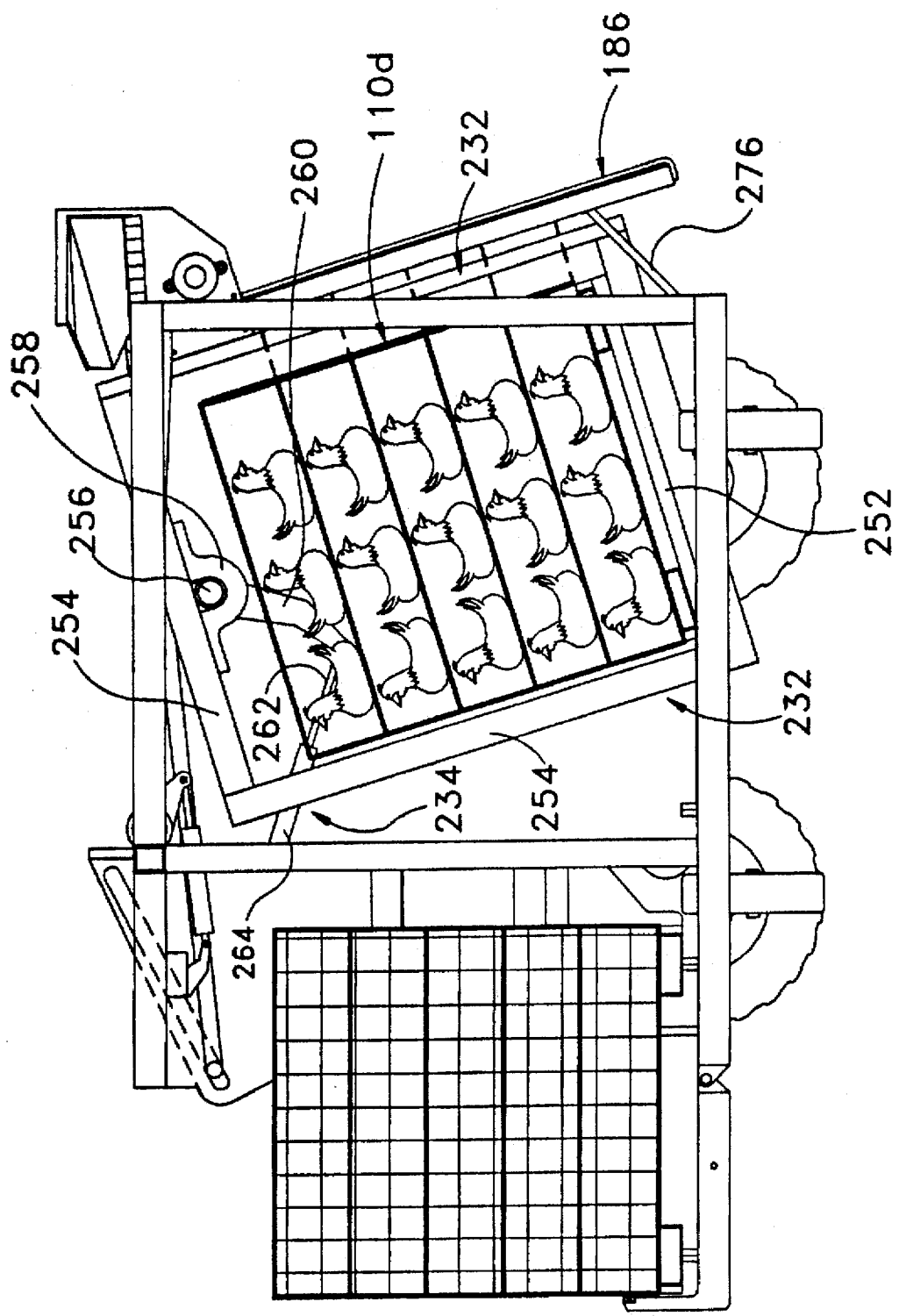

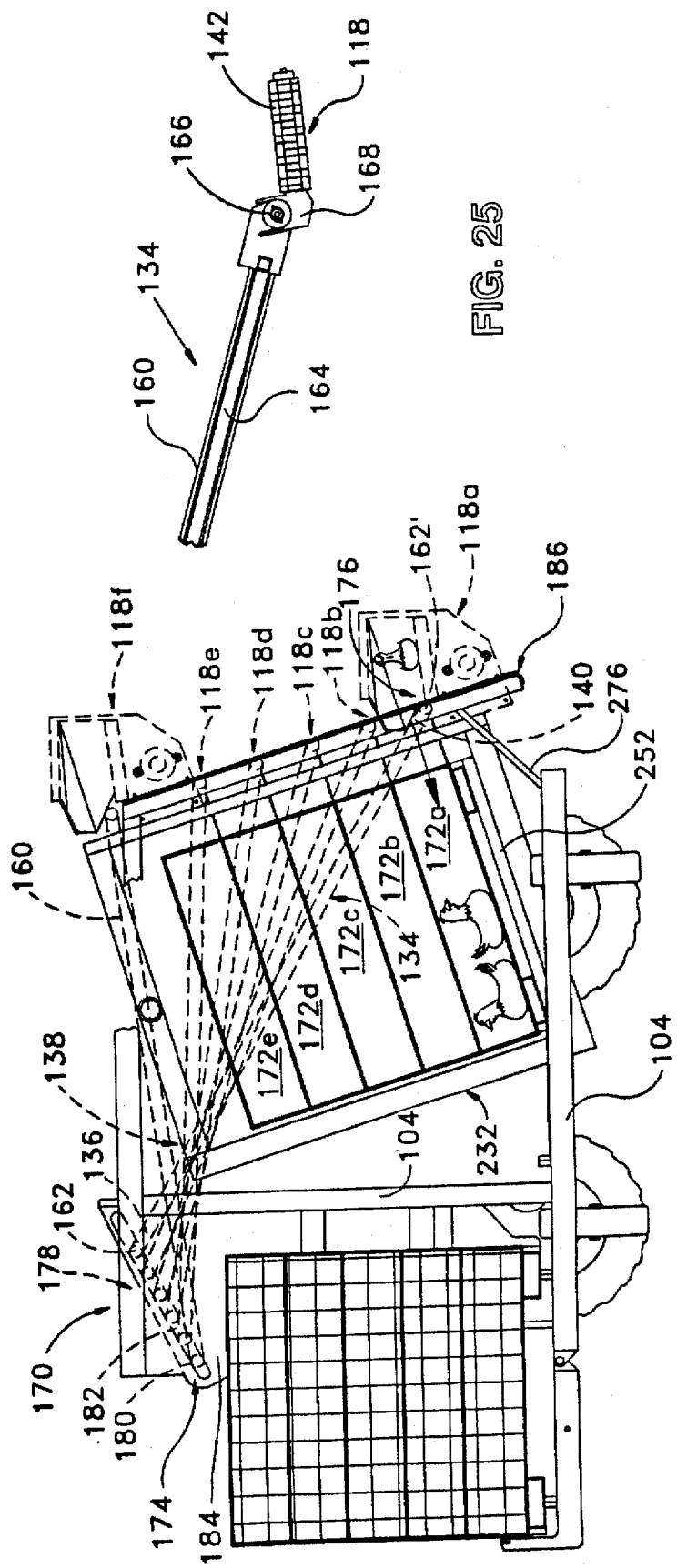

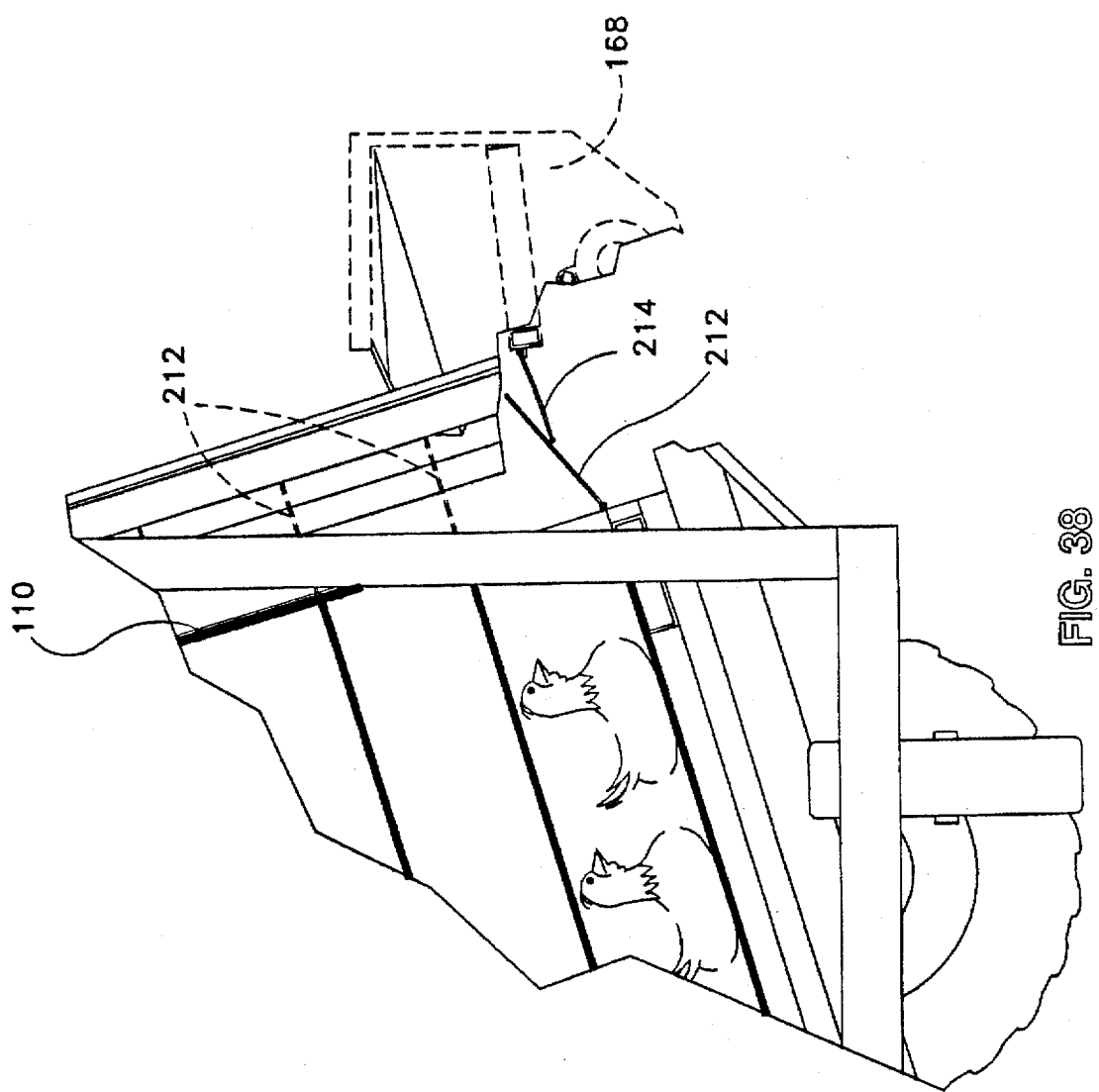

METHOD AND APPARATUS FOR COOPING CHICKENS

CROSS-REFERENCE TO RELATED APPLICATION

This application is a continuation-in-part of my application, Ser. No. 08/342,493, filed Nov. 21, 1994, entitled IMPROVED METHOD AND APPARATUS FOR COOPING CHICKENS, now U.S. Pat. No. 5,592,902.

BACKGROUND OF THE INVENTION

The present invention teaches a chicken harvesting and cooping apparatus supported on a vehicle by which the apparatus can be maneuvered inside of a chicken house as well as down a highway. It should be understood that throughout this disclosure the term "chicken", as used herein, is intended to include chickens, turkeys and ducks, and any other commercially grown fowl that advantageously can be gathered or harvested by the present invention. The present invention sets forth both method and apparatus for translocating chickens from a chicken house or chicken growing area into commercial chicken coops.

In the prior art, it is common practice for a fork lift to bring to the chicken cooping machine an empty coop which must be placed on the ground temporarily while a filled coop is removed from the machine. To prevent the machine being idle during the subsequent operation, the filled coop is temporarily set down, then the empty coop is again picked up and set on the machine; and, thereafter, the full coop is again picked up and loaded onto a truck. Then the forklift vehicle brings another empty coop to the cooping machine as the operation is repeated in the before described time consuming manner.

This time consuming duplication of effort is expensive because all of the extra maneuvering slows down the main operation of gathering and cooping the chickens with the chicken cooping machine. Hence loading and unloading the empty and filled coops is a bottle-neck that reduces the efficiency of prior art chicken cooping machines.

The legal road width usually limits the width of most vehicles to 8 or 8.5 feet which prevents most any chicken cooping machine to be built with adequate width for simultaneously accommodating both a full and an empty chicken coop, unless the coop support is elevated above the support wheels of the cooping machine. This necessitates fabricating the cooping machine at an excessive elevation. Therefore, simultaneously accommodating and manipulating both an empty and a full coop in conjunction with a chicken cooping machine as not found in the prior art.

Another factor that limits the width of a cooping machine is the width of the entrance into the chicken house, which sometime is inadequate for admitting a chicken gathering machine having a width adequate for simultaneously handling both an empty coop and a full coop.

The standard commercial chicken coop is a multi-tiered coop, five tiers high, with each tier being divided into three individual compartments. The compartments of each tier is provided with horizontal, over-the-center, spring loaded doors for accepting and discharging chickens therethrough. Transferring a uniform weight of chickens into the individual compartments of a tier is not always possible with prior art machines, and often too many chickens are packed into one compartment, while too few are caged in another. This results in losses during hot weather. Therefore it is desirable to be able to coop chickens in such a manner that a predetermined number of chickens is automatically translocated into each of the individual compartments of a standard coop.

Another drawback of a chicken cooping machine is the difficulty of properly arranging the standard commercial multi-tiered coop in proper aligned relationship respective to the discharge of the chicken cooping machine. In addition to the difficulty of properly aligning the horizontally disposed compartments of the vertically spaced tiers with the chicken discharge of the cooping machine, it is also necessary to sequentially align each of the individual vertically spaced tiers with the chicken discharge so that each compartment of each tier is suitably filled. This is especially difficult to achieve because the large coop must first be moved into a proper position where it can be engaged by the tilting apparatus, where it is then tilted away from a vertical plane in order to assume an angle that is sufficient for the chickens introduced through the coop entrance to gravitate towards the back of the individual compartments, thereby leaving room for additional chickens.

One of the most important subcombinations of this invention is the apparatus for engaging and moving the chickens that are on the floor of the chicken house, and translocating the caught chickens to another part of the cooping machine. This is accomplished by a boom that extends from the chicken cooping machine, and has a gathering head supported at the far end thereof, hereinafter referred to as the gathering end.

The present invention, as will be appreciated by those skilled in the art after studying this disclosure, provides improvements over all known prior art chicken gathering and cooping apparatus by sequentially moving chickens from a flock of chickens into a conveyor means where the chickens are transported to another part of the apparatus where they are cooped. By the present invention it is possible to sequentially gather chickens in either of one or two parallel streams, thereby doubling the flow of chickens thereinto; or, reducing the flow of chickens, as may be desired, all of which increases the utility of the cooping apparatus. This is achieved by an improved gathering head which catches and deposits the caught chickens onto a moving conveyor in a new, unobvious, and improved manner. The present invention overcomes many other problems and drawbacks associated with the prior art by the provision of an improved gathering head in combination with an improved apparatus for the discharge of chickens into the individual compartments of a tier of a chicken coop, and, also improvements in the handling of the filled and empty coops. Both method and apparatus by which these desirable and novel attributes are realized are the subject of the present invention.

SUMMARY OF THE INVENTION

This specification sets forth the precise invention for which a patent is solicited, in such a manner as to distinguish it from other inventions and what is old. This invention comprehends method and apparatus from harvesting commercially grown chickens by translocating the chickens from a flock of chickens within a chicken house in to a multi-tiered coop in a new and unobvious manner.

Specifically, the improved apparatus of this invention includes a vehicle having a frame, with one end an elongated boom being pivotally mounted to the forward end of the frame, and a coop support being mounted to the trailing end thereof. A gathering head is suitably mounted to the opposed end of the boom.

In the preferred embodiment of the invention, the gathering head apparatus comprises a pair of rotatable sweep members mounted to rotate about perpendicularly arranged axis, and having radially arranged elements mounted thereon for rotatably engaging chickens there between, and gently urging caught chickens to sequentially move therethrough, thereby harmlessly sweeping the chickens onto a boom conveyor. The boom conveyor is supported along the length of the boom, and a special hollow journal means attaches a pivoted end of the boom to the frame of the vehicle to allow the gathering head to be moved simultaneously in a vertical and a horizontal plane.

Multi-tiered coops are positioned adjacent to the trailing end of said frame and manipulated automatically, in such a manner that there is always an empty next coop available after a last coop has been filled and positioned for unloading.

The unique chicken gathering head of this invention gathers chickens from a flock of chickens and arranges the caught chickens in a row onto the boom conveyor which moves the row of chickens in a continuous stream to a boom conveyor discharge end located at the pivoted end of the boom conveyor. An intermediate conveyor system, comprising several conveyor means, is arranged respective to the hollow journal at the discharge end of the boom conveyor for receiving the chickens discharged from the boom conveyor. As the chickens travel along the intermediate conveyor system on their way towards a coop, the stream of chickens encounter a novel transfer divider means which evenly divides the stream into one of a plurality of parallel paths, each simultaneously leading into the individual compartments of the plurality of tiers of the multi-tiered coop, all in a manner heretofore unknown to those skilled in the art.

A novel elevator means vertically positions the transfer divider device respective to the vertically spaced tiers of the coop to evenly distribute the several parallel paths of chickens discharged from the divider directly into the several compartments of a selected tier of the coop. At the same time, the discharge from the intermediate conveyor system is properly aligned with the vertically traveling transfer divider device for orderly transferring chickens therebetween.

Therefore, a primary object of the present invention is the provision of method and apparatus for harvesting commercially grown chickens by translocating chickens growing within a chicken house into a multi-tiered coop in a new and unobvious manner.

Another object of the invention is to provide a gathering apparatus comprising a pair of rotatable sweep members mounted to rotate about perpendicularly arranged axis, and having radially arranged elements thereon for rotatably engaging and urging chickens to move therethrough and thereby sweeping them onto a boom conveyor that is supported along the length of the boom.

A further object of this invention is to disclose and provide a chicken gathering apparatus for gathering chickens onto a conveyor, which moves the chickens onto a conveyor system where the chickens are transported to a transfer divider means. At the transfer divider means the chickens are divided into one of a plurality of horizontal parallel paths, each leading to the individual compartments of one of a plurality of tiers of a coop.

A still further object of this invention is to provide a novel elevator and transfer divider means which is sequentially arranged in indexed relationship respective to consecutive adjacent tiers of a multi-tiered coop, whereby a plurality of pairs of contra-rotating sweep members, each having radially arranged elements thereon, engage and urge the chickens received from a group of chickens to move along several parallel rows therethrough and into the coop. Still another object of this invention is to provide a chicken cooping apparatus with a novel elevator means that vertically positions a transfer divider device respective to the vertically spaced tiers of a coop to evenly distribute chickens discharged therefrom into the several compartments of a selected tier of the coop.

A further object of this invention is to provide means for tilting a multi-tiered coop into a predetermined position adjacent to an elevator means which vertically positions a transfer divider device respective to the vertically spaced tiers of the coop to evenly distribute the chickens discharged from the divider means directly into the several compartments of a selected tier of the coop, while at the same time, the discharge from a conveyor system is properly aligned with the vertically traveling transfer divider device for orderly transferring chickens therebetween.

A still further object of this invention is to provide apparatus for manipulating coops automatically into a predetermined position adjacent the trailing end of said frame, in such a manner that there is always an empty next coop available after a last coop has been filled and positioned for unloading from the frame.

An further object is to provide a modified apparatus for gathering and cooping chickens into chicken coops, which apparatus includes a frame; chicken gathering means supported from the frame for gathering chickens; chicken coop handling means for receiving and maneuvering the chicken coops and for successively positioning the chicken coops into a tilted position at a loading area of the apparatus; transporting means for receiving gathered chickens from the chicken gathering means and delivering the gathered chickens to the loading area; and chicken loading means at the loading area for receiving chickens from the transporting means and for loading the chickens into the chicken coops.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

BRIEF DESCRIPTION OF THE DRAWINGS

FIG. 16 is a fragmentary top view of an an enlarged scale showing a portion of the chicken loading means.

FIG. 17 is a view similar to FIG. 16 but with parts removed for purposes of illustration, and showing a portion of the coop handling means, and showing a chicken coop after a tier thereof has been loaded.

FIG. 19 is a top view on an enlarged scale of the first chain drive assembly means.

FIG. 20 is a side elevational view of that shown in FIG. 19.

FIG. 21 is a rear elevational view of the modified apparatus of the present invention with the carriage means shown in a tilted position; with two of the coops being shown in different positions; and with parts being removed for purposes of illustration.

FIG. 24 is a view somewhat similar to FIG. 21 showing diagrammatically the various positions of the transverse conveyor means corresponding to the various stopped positions of the loading conveyor means for loading chickens at the various tiers of the coop being loaded, and showing the lowermost and uppermost positions of the loading conveyor means.

FIG. 25 is a fragmentary view of a portion of the transverse conveyor means and the loading conveyor means.

FIG. 38 is a cut away view of a portion of the modified apparatus showing the closure means for closing the doors of the chicken coops.

DESCRIPTION OF THE PREFERRED EMBODIMENT

This invention sets forth both method and apparatus for mechanically cooping chickens by translocating the chickens from a flock of chickens living within a commercial chicken house, for example, into a multi-tiered commercially available chicken coop.

Figure 1:
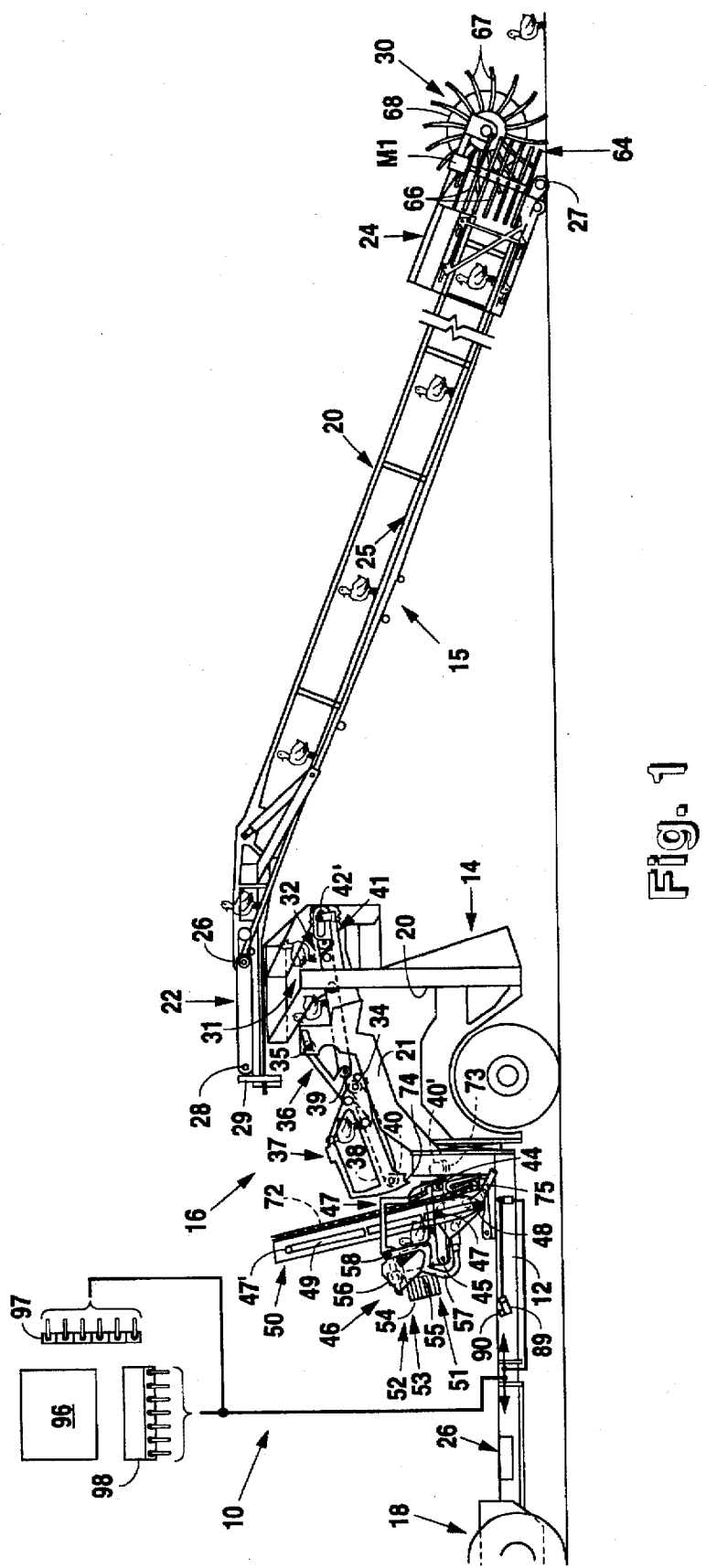
FIG. 1 is a side elevational view of the present invention, with some parts thereof being broken away or removed therefrom to conserve space and to better illustrate important hidden details thereof.

Specifically, as seen illustrated in various Figures of the drawings, the preferred embodiment of the chicken cooping apparatus 10 of the invention comprises a frame 12 having a forward boom support end 14 to which a near end of a boom 15 is pivotally mounted. In FIG. 1, together with other Figures of the drawings, a cooping central part 16 is located between the forward boom support end 14 and rear coop storage part 18, the latter of which terminates in the trailing end of the frame 12. A number of support members 20 and 21 are mounted at the opposite sides of the forward end 14 of the frame 12 and serve as a means by which the numerous mechanical apparatus of the invention are suitably supported at various elevations respective to the frame 12.

Figure 2:
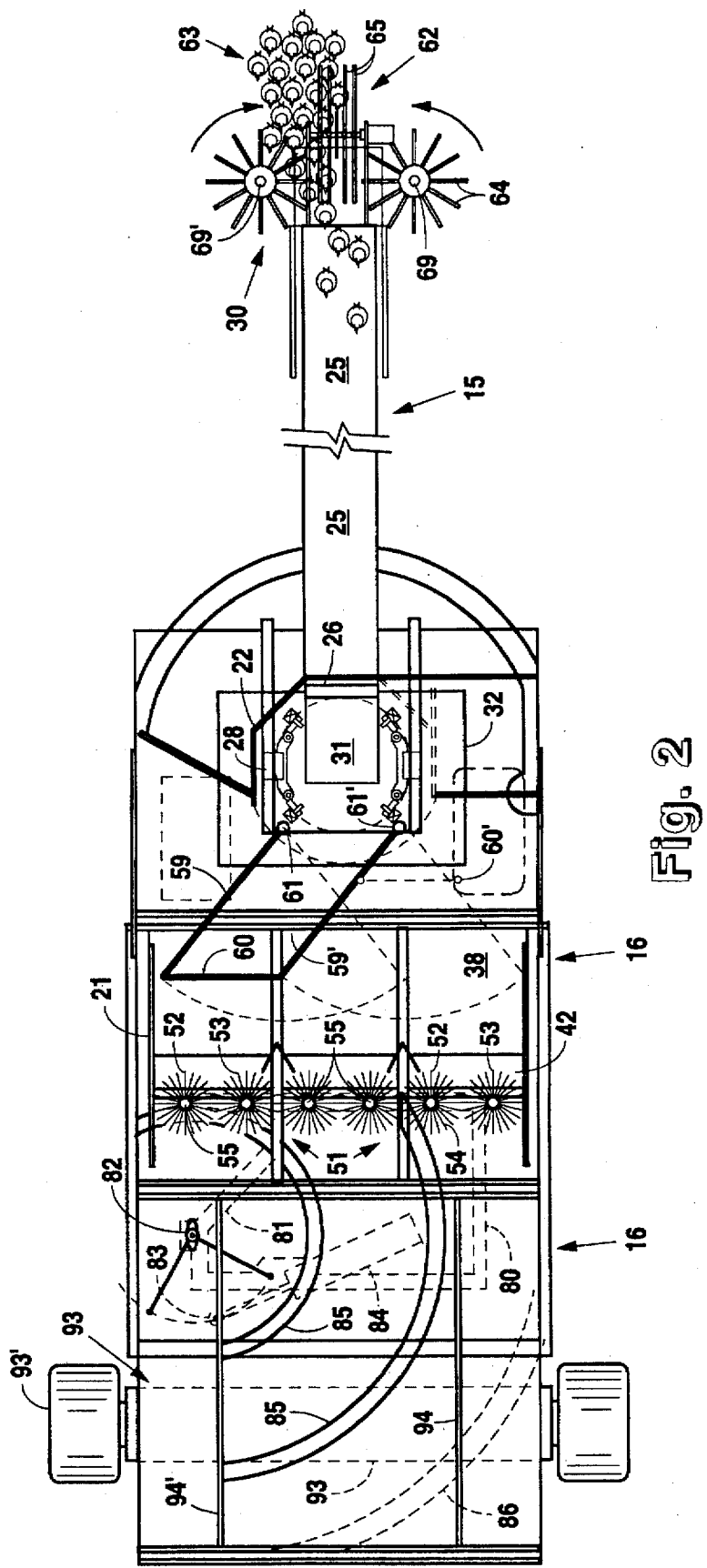
FIG. 2 is a top plan view of the apparatus of FIG. 1, with some parts thereof being broken away and removed therefrom to illustrate some additional details thereof.

In FIGS. 1 and 2, the upper end of the vertical support 20 is built up into the illustrated framework which suitably receives a pivoted end 22 of the boom 15. The opposed boom ends, 22 and 24, more or less coincide with the opposed ends of a first or boom conveyor means 25, such that the boom conveyor is supported along the length of the boom. Hence, the upper run of the boom conveyor forms an upper surface of the boom. The opposed ends of the boom conveyor 25 terminate at journaled conveyor ends 26 and 27 thereof. Opposed sides of the boom are provided with a longitudinally extending wall which prevent chickens from falling off the conveyor.

Journal means 28 attach the boom pivoted end 22 to the forward end 14 of frame 12 in a manner such that the boom gathering end 24 can be moved vertically about a horizontal axis formed at the journal means 26. Additionally, a hollow turntable 29 forms a large hollow journal by which the boom pivoted end 22 can be rotated about a vertical axis and thereby pivot the gathering end 24 in a horizontal plane. Thus the boom end 24 can simultaneously be moved in a vertical and a horizontal plane.

In FIGS. 1, 2, and 11–13, a chicken gathering apparatus 30, made in accordance with this invention, is supported from the boom gathering end 24 for gathering nearby chickens onto the receiving or gathering end 24 of the first conveyor means 25. The uncaught chicken may be living within a commercial chicken house, and when they encounter the gathering apparatus 30, they are caught and sequentially removed from the floor of the chicken house onto the receiving end of the first conveyor means 25. The caught chickens are content to ride on the conveyor 25 from the gathering end 24 up beyond conveyor end 26, where the caught chickens fall through the large, hollow, boom pivot that forms a chute at 31. The chute 31 underlies the boom conveyor discharge end (near 26) located near the boom pivoted end 22.

Figure 8:
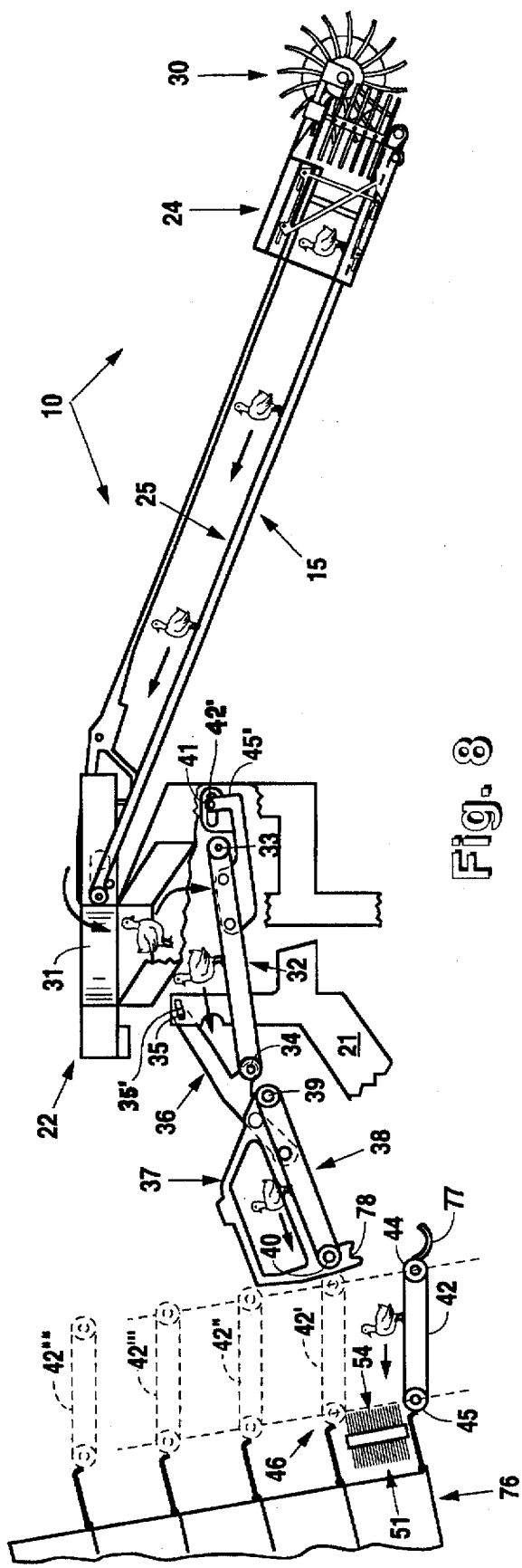

As particularly illustrated in FIGS. 1, 2, 4 and 8, the arrow at numeral 31 illustrates the path of the chickens as they gravitate from end 26 of the first conveyor means 25, also called the boom conveyor means 25, through the illustrated short chute 31, where they are received by a second conveyor means 32. In FIG. 8, the second conveyor means 32 has a receiving end 33 opposed to a discharge end 34. The receiving end 33 underlies the chute 31 that communicates with the discharge of the first conveyor means 25.

The before mentioned supports 21, which form opposed intermediate conveyor supports, are fixed respective to the frame 12. The supports 21 upwardly and forwardly extend to terminate in a pivot journal 35 received within a slot 35', and thereby captures one end of an arm of a crank 36 for pivotal and slidable movement therewith. The discharge end 34 of conveyor means 32 is journaled for pivotal movement to the end of a second arm of the crank 36 in spaced relationship respective to pivot journal 35.

Figure 5:
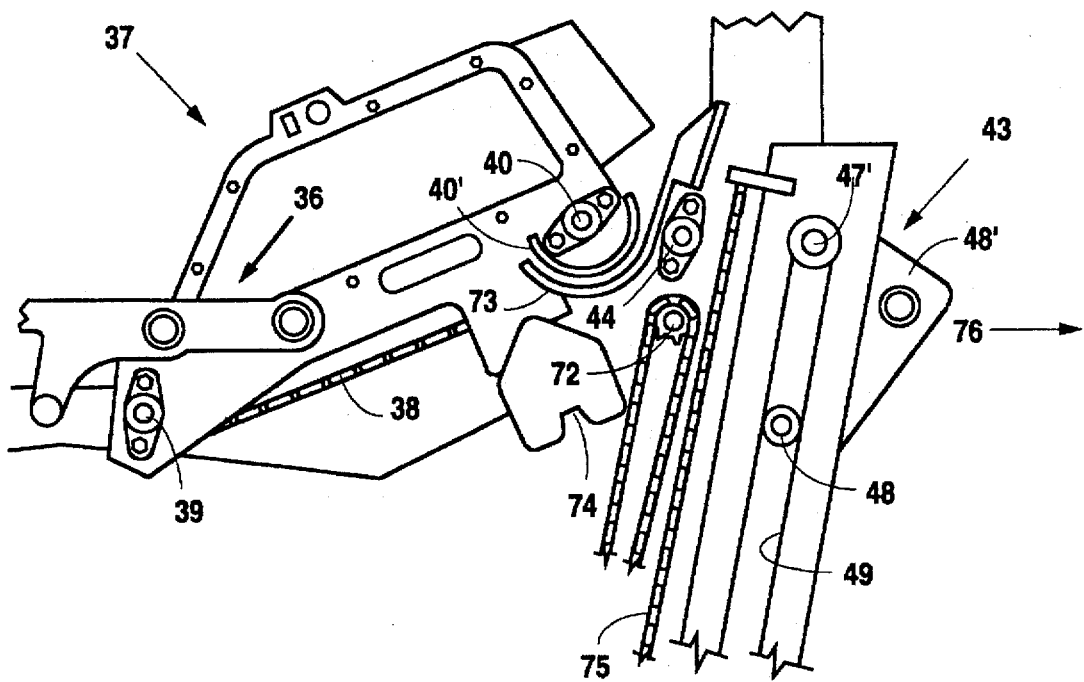
FIG. 5 is an isolated, fragmentary, detailed, side view of part of the apparatus disclosed in FIGS. 1–3.

In FIGS. 5 and 8, the support member or crank 36 is affixed to support frame 37, the latter of which is covered with thin metal to form opposed vertical sidewalls for the third conveyor 38, so that chickens are restrained from falling off the sides thereof. The opposed ends 39 and 40 of third conveyor 38 are supported by attaching the journals thereof to the lower member that forms the lower side of the quadrilateral configured support frame 37. The opposed ends 34 and 33, respectively, of conveyor 32 are supported by the conveyor support member 36 and 45', respectively, the latter of which terminates in a journal at 41 that is received within the illustrated slot 42' therefor. This structure mounts the conveyors 32 and 38 such that they are always aligned with one another to form an intermediate conveyor system connected for delivering between the boom conveyor 25 and the last or fourth conveyor 42.

The fourth conveyor means 42 of FIGS. 1 and 5–8 has a receiving end 44 spaced from an opposed discharge end 45. The opposed ends 44, 45 of the fourth conveyor means 42 are mounted on the illustrated carriage 43, together with other parts thereof that jointly comprise a transfer divider 59 (see FIG. 2) and discharge apparatus 46 (see FIGS. 1, 6, and 7) of this invention. The receiving end 44 of the fourth conveyor means 42 of the transfer divider and discharge apparatus 46 is positioned to receive chickens that gravitate from the discharge end 40 of the third conveyor 38 of the intermediate conveyor system.

The arm of crank 36, frame 37, and conveyor support 45' (see FIG. 8) are therefore attached to one another in a manner to admit limited pivotal movement of the discharge end 40 of the intermediate conveyors 32, 38 about the pivot at journal 41 within the limits afforded by the cooperative action of both slots 35' and 42'. This cooperative action allows the discharge at 40 of the intermediate conveyor system to be positioned in aligned relationship with respect to the fourth conveyor 42, the latter of which forms part of the transfer divider and discharge apparatus 46, and therefore moves vertically for accessing either of the illustrated five coop tiers.

The conveyor journals located at discharge end 40 of the intermediate conveyor system forms a pickup point at opposed sides thereof, as will be better appreciated later on in this disclosure. For the moment it should be understood that the intermediate conveyor system can be pivotally moved about the illustrated pivot that is captured in the slot at 42' thereof, while slot 35' allows limited pivotal movement of the conveyors 32 and 38 from the illustrated position of FIG. 1 into a plurality of elevated positions illustrated in FIGS. 7 and 8 by lifting the frame 37 at pickup point 40' in the illustrated manner of FIGS. 1 and 5–8.

Figure 6:
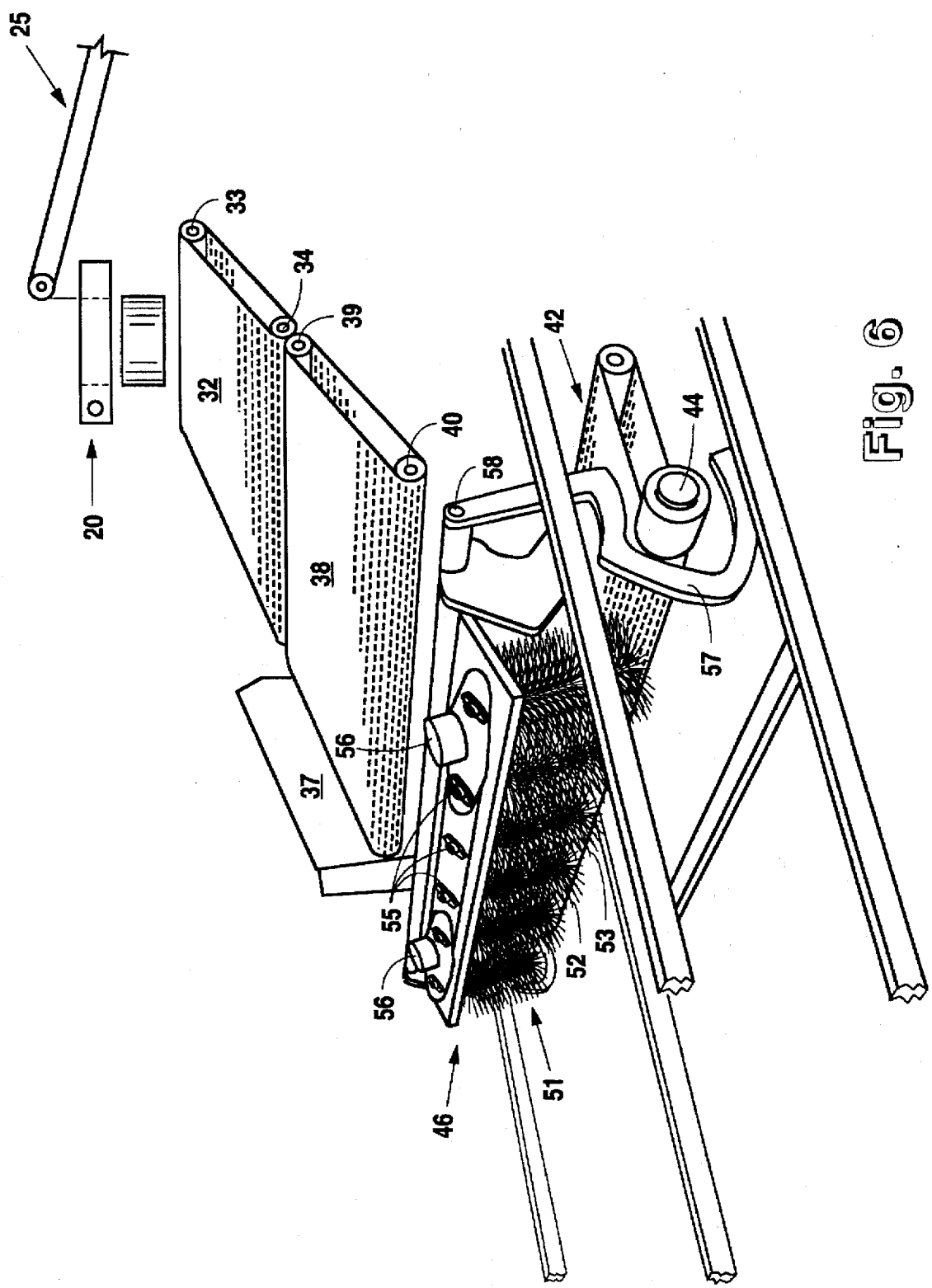
FIG. 6 is a fragmented, three-quarter perspective view showing part of the gathering and cooping machine of this invention in another operative configuration.
Figure 7:
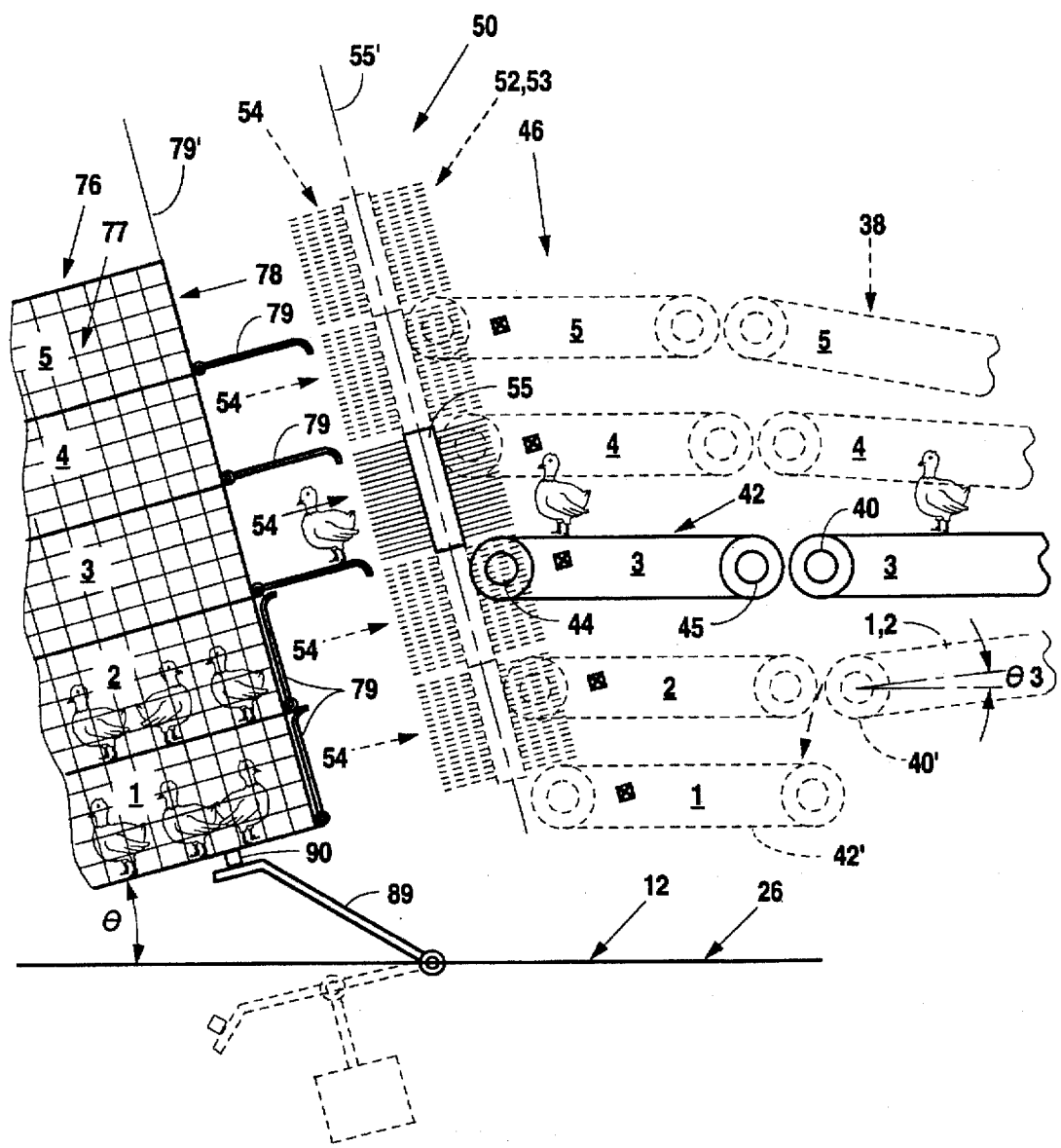
FIGS. 7 and 8 set forth a part schematical, part diagrammatical, side view showing the operation of part of the apparatus disclosed in the foregoing Figures.

As best seen illustrated in FIG. 5, the transfer divider and discharge means 46 includes a carriage 43 mounted on rollers 47 and 48, which are captured for movement within guides or slots 49 formed in the sloped support 50, all of which forms a novel elevator means which is arranged in the manner of FIGS. 1, 2 and 6–8; and which positions or registers the transfer divider means 46 respective to the individual horizontally spaced compartments of a selected one of the vertically spaced tiers of the chicken receiving coop 76. A brush assembly 51, comprising spaced pairs of contra-rotating brushes 52 and 53, (see FIG. 6) is sequentially arranged adjacent each of the five tiers 1–5 and positioned as shown in FIGS. 6 and 7 at the opening leading into each of the coop compartments. As best seen illustrated in FIGS. 1 and 6–8, the brushes 52, 53 each have resilient radial elements depending from an axial shaft 55. A chain drive is connected to the shaft 55 to be driven by hydraulic motors 56. The motors 56 and drive train therefor are mounted to rotate axially the six coacting shafts 55 that are supported from the carriage 43 of FIGS. 1 and 5.

Door closer 57 of FIGS. 1 and 6 is mounted to pivot about a journaled shaft 58 concurrently with the sequential vertical repositioning of the brushes 52, 53 of brush assembly 51. This action closes the door of the last filled coop tier while pivotally rotating the entire brush assembly out of the path of the coops in order to avoid contact with the coop structure as the carriage 43 moves the divider apparatus 46 from the filled tier up to the next adjacent empty next coop tier, and will be more fully appreciated later on herein.

In FIG. 2, a pair of parallel vane-like rudders 59, 59' are attached in aligned relationship respective to one another. The ends of a spreader bar 60 are journaled to the free ends of the vane-like rudders to maintain the spacing therebetween. A hydraulically actuated piston assembly (not shown) is connected at 60' for pivoting the vanes about pivots 61, 61' which effects oscillatory motion thereinto. The vanes therefore acquire equal distribution of the chickens passing along the intermediate conveyor system, and then through the transfer and discharge means 46, and finally into the appropriate compartments of a tier.

As seen in the illustration of FIG. 2, together with FIGS. 6 and 8 of the drawings, the chickens are received from the chute 31 and are forced to travel along the path defined by the parallel vanes 59, where they are transferred onto the last conveyor 42 located below and immediately upstream of the brushes 51. The pair of brushes 52, 53 separate the accumulated small group of chickens into either of the three separate rows of traveling chickens; i.e., through the three sets of brushes. Hence, the chickens of either row are discharged sequential from between each pair of contra-rotating brushes 52, 53 and are thereby moved directly into the appropriate compartments of a selected tier of the coop.

Figure 11:
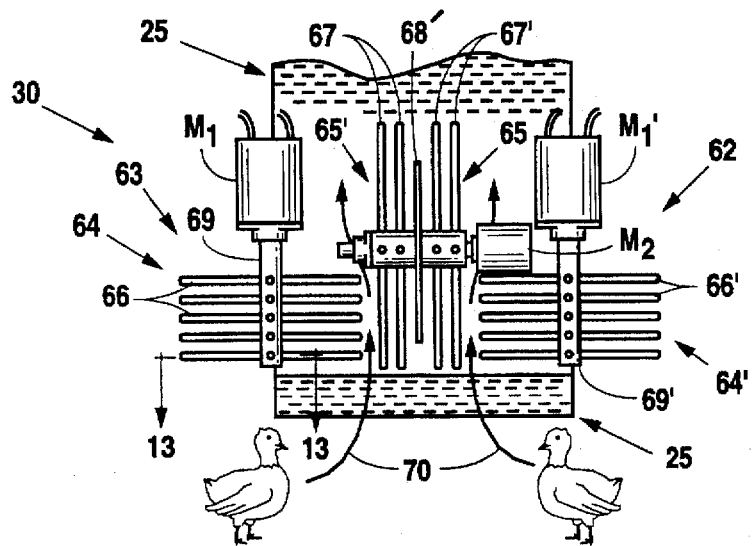
FIG. 11 is a front view of part of the apparatus of FIGS. 1 and 2.
Figure 12:
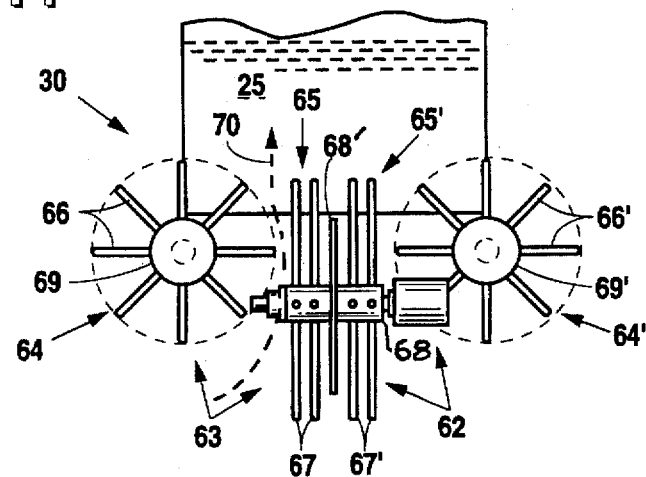
FIG. 12 is a broken, top plan view of the apparatus seen in FIG. 11, with some additional parts thereof being broken away or removed therefrom to better illustrate important details thereof; and, FIG. 13 is an enlarged, partly dissembled, cross-sectional view taken along line 13—13 of FIG. 11.
Figure 13:
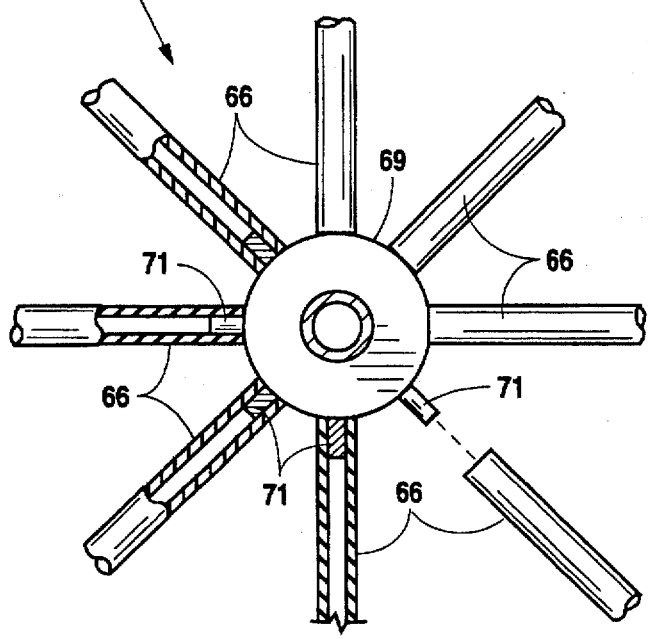

In FIGS. 1–3 and 11–13, the chicken gathering apparatus 30, made in accordance with this invention, comprises two adjacent gathering devices that are arranged in confronting relationship as seen at 62 and 63. As best seen in FIGS. 11–13, each of the two gathering devices 62 and 63 include opposed pairs of rotatable sweep members 64, 64' and 65, 65'; respectively, having radially arranged, resilient, finger-like elements 66, 67, and 66', 67', respectively; extending radially from a multiplicity of mounting nipples 71. In FIG. 13, together with FIGS. 11 and 12, the nipples 71 are affixed to radiate from the illustrated axially located shafts 68, 69, and 69', respectively; for securing the resilient fingers 66 and 67 thereon. The resilient fingers 66 and 67 engage and urge chickens to move sequentially through a deformable passageway 70 formed as a chicken passes therebetween; as seen illustrated in FIGS. 11 and 12. The spacing between the rotatable sweep members 64, 65 and 64', 65' at 70 is about one-half the width of a chicken, or about 2.5 inches. This is adequate for accommodating a six pound chicken. The relative position of the shaft ends can be adjusted to change the spacing in order to accommodate other size chickens, as may be desired.

The vertical shafts 69, 69' contra-rotate respective to one another, and preferably rotate in synchronization with one another; and, more or less in synchronization with the co-acting horizontal axis sweep members 65, 65' when comparing the peripheral velocity of the outer ends of the fingers respective to the associate lowermost fingers 66, 66' of the vertical axis sweep member 64. A divider 68' can be included to divide the fingers 67 from the fingers 67', if desired. The provision of a single pair of sweep members 64 and 65, with or without the divider 68' is considered within the comprehension of this invention. The divider, when included in the combination, can be a plastic disk having an outside diameter less that the overall diameter of the sweep members 65, 65'.

It was found that the resilient fingers 66 and 67 of FIGS. 11–13 can advantageously be made from a length of commercially available, fabric reinforced, synthetic rubber tubing having the near marginal end telescopingly forced about the illustrated cylindrical holders or nipples 7 1 that are affixed to the axial member by welding. The rubber tubing used for making fingers 66 can be commercially available automotive water heater or fuel hose having a length of 10–15 inches and a diameter of ½ to ⅝ inches; while the hose for fingers 67 is slightly larger and has a length of 12–18 inches and a diameter of ⅝–¾ inches.

There are a series of 55 nipples arranged in 11 longitudinal or axially arranged rows, with each of the rows having 5 nipples therein, and with the rows being arranged circumferentially about the axial shaft member. The nipples of adjacent roars are staggered respective to one another, as shown, and are of a length and diameter respective to the hose inside diameter so that a compression fit is realized therebetween which secures the hose end fastened securely in place respective to the axially rotating inner cylindrical shaft. An occasional chicken may inadvertently be caught between the sweep members 65 and the end of the conveyor 25, respectively, and harmlessly rotated onto the conveyor 25.

There are 32 nipples rigidly mounted on each of the marginal opposed ends of the common shaft 68, arranged in two circumferential roars 67, with there being 16 nipples in each said circumferential row as shown.

In FIGS. 1 and 5, together with FIGS. 7 and 8, a chain lift 72 is suitably connected to elevate the carriage 43 of the transfer divider and discharge means 46 by releasable engagement with the illustrated J-hook 73. As particularly seen in FIG. 5, the J-hook 73 is affixed to the carriage structure at a location to intercept and lift the complimentary configured curved member 40' during the upward travel of the transfer divider and discharge means 46, thereby elevating the transfer divider and discharge means 46. The curved member 40' is arranged concentrically respective to the conveyor journal 40.

A lower stop 74 is positioned at the lower end of the pivoted support frame 37 for engaging the frame 12 during its downward travel to thereby position journal 40 at its lowermost position of travel. As seen in 40' in FIG. 8, the pivoted support frame 37 remains at this lower position while the carriage 43 continues to descend to the adjacent bottom-most tier (see FIGS. 1, 7 and 8). Chain 75 of FIG. 5 is meshed with the illustrated sprockets to lift the carriage 43 in a manner similar in action to the lifting of the forks of a prior art forklift vehicle.

In FIGS. 7 and 8, a multi-tiered coop 76 is removably positioned with the open doors 79 being placed adjacent to and confronting the discharge means 46, as shown. It will be noted that the open coop doors span the intervening space between the coop entrance and the rotating brushes 51 of the transfer divider and discharge means 46, thus providing a temporary floor for containment of the rows of chickens simultaneously traveling from the transfer divider and discharge means 46 into the compartments 77 of coop 76.

Figure 9:
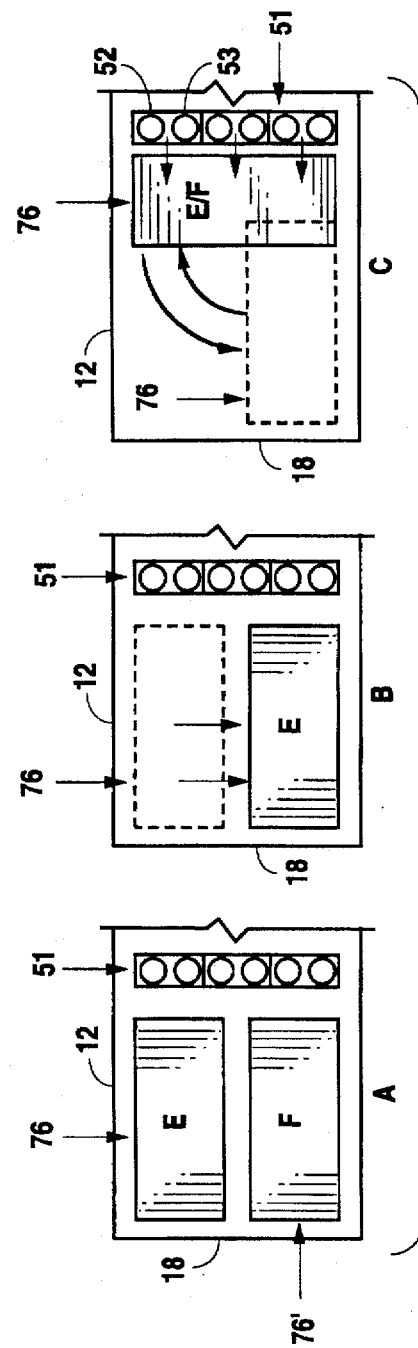
FIGS. 9A, 9B, and 9C are top plan views diagrammatically illustrating the operation of part of the apparatus of the invention.
Figure 10:
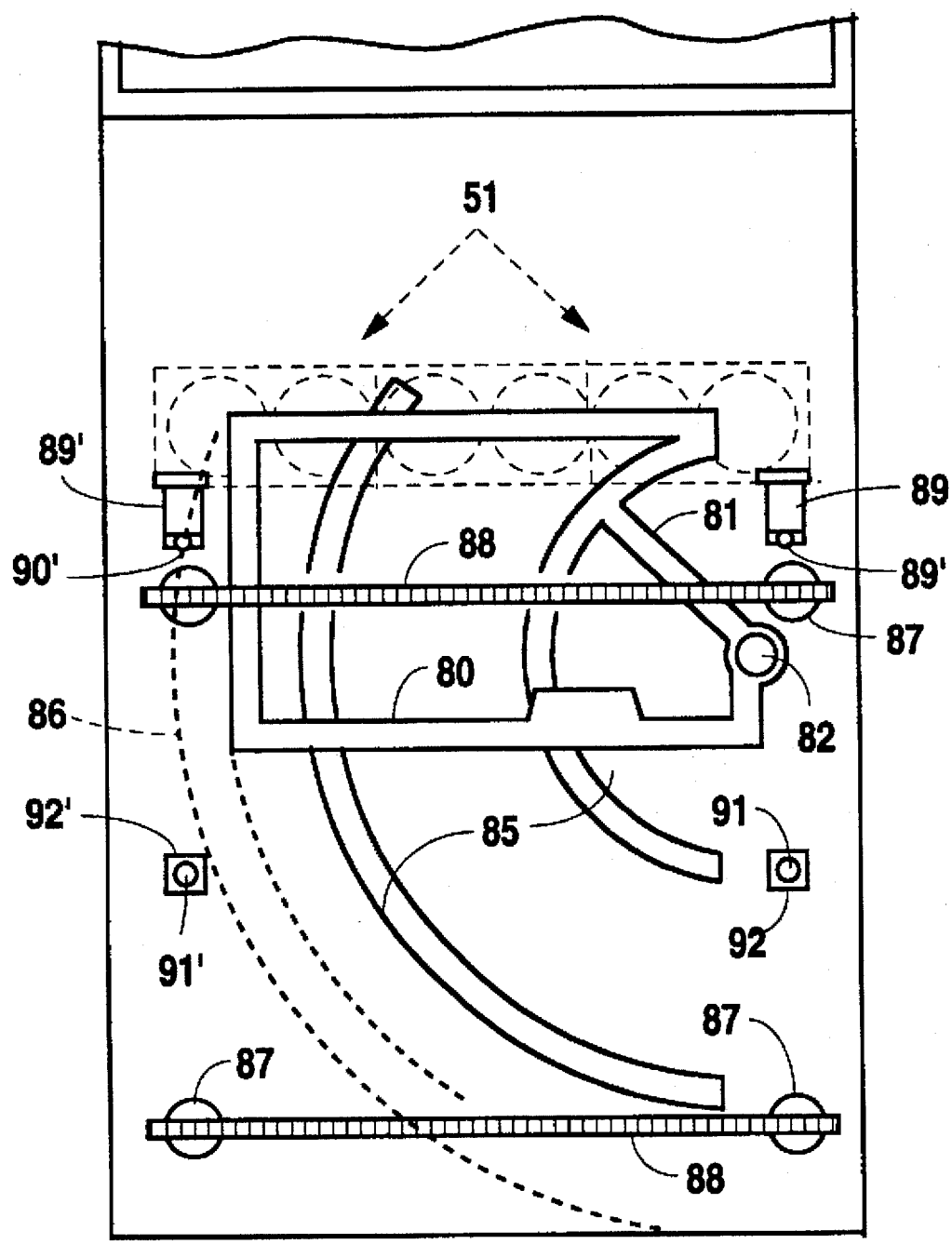
FIG. 10 is a broken, top plan view of the rear part of the apparatus of FIG. 2 illustrating additional features of the invention.

The details of the mechanism that automatically position coop 76 on the rear part 18 of frame 12 is illustrated in FIGS. 2, 9 and 10, together with other figures of the drawing. As particularly illustrated in FIGS. 2 and 10, a coop rotator and support frame 80 has rotator linkages 81 integrally attached thereto for pivoting frame 80 about a pivot journal 82. An actuator cylinder 84 interconnects the rotator linkages 81 of support from 80 to a frame member at journal 83 (see FIG. 2) for controllably pivoting the support member from a lateral into a longitudinal position, and vice versa, as is illustrated in FIGS. 2, 9B, and 10. Two curved supports 85, as seen in FIGS. 2 and 10, slidably support the coop support frame 80 for movement thereon along the dot-dash path indicated by numeral 86. As seen in the illustrated positions of FIGS. 9A, 9B and 9C, the coop support frame 80 pivotally supports and moves the coop 76 from one to the other of the illustrated lateral and longitudinal positions, which are perpendicular to one another.

In FIG. 10, four air lifters, seen illustrated at 87, are mounted to the frame 12 in underlying relationship respective to the spaced parallel endless chain apparatus 88. One of the four air lifters engages one of the ends of a chain apparatus 88 to elevate the upper run of each of the chain apparatus from a retracted position, where the upper runs of the chains are free of the coop, into an extended position, in which the upper run engages and supports the bottom of a coop. This elevates the coop above the intervening mechanisms, whereupon the chain apparatus can then laterally move the coop, and finally sets the coop down onto the coop rotator and support frame 80. Therefore, the pair of endless chain apparatus 88 are arranged to move a coop from the empty position E of FIG. 9A onto the coop support frame 80 (FIG. 9B), and vice versa in accordance with the teachings of FIGS. 2, 9 and 10.

After the empty coop has been rotated 90 degrees into the lateral position in the illustrated manner of FIGS. 2 and 9C, it is then tilted towards the rear of the frame (see FIG. 7). This is accomplished by apparatus 89 for tilting, and apparatus 90 for weighing the coop 76, as seen in FIGS. 7 and 10. In FIG. 10 there are two forward coop tilters 89 having load cells 90 mounted thereon, and two rear coop tilters 91 also having load cells 92 mounted thereon. All four of the tilters 90, 91; 90', 91', are pivotally mounted to the frame and include means connected thereto by which they are pivoted in order to elevate the coop 76 into an inclined position as best seen illustrated in FIG. 7. The forward tilter 89 and load cells 90 thereof elevate the coop a large amount as compared to the rear tilter 91, 91' and load cells 92, 92' in order to position the coop entrances along a plane 79' that is spaced from and parallel to the plane 55' in which the confronting discharge means 46 travels, in accordance with FIGS. 7 and 8. Also see the forward tilter 89 and load cells 90 in FIG. 1.

In FIGS. 1, 2, 3 and 10, the rear wheels 93 are seen to be mounted to a telescoping section 93 that forms the rear axle. The axle is supported at 94 from the frame structural members, and the axle telescopes together and apart to increase the width of rear part of the frame, thereby accommodating the movement of the coops 76 while at the same time retaining a low overall profile. Therefore the wheels telescope together an amount to reduce the width of the machine to the legal road limit, and telescopes the wheels apart sufficiently to accommodate the operation of the coops as set forth in conjunction with FIGS. 9 and 10.

In FIG. 1, a computer means 96 is connected to receive signals from a multiplicity of sensors 97, such as may be related to various position sensors seen at 97' in FIG. 7, and weight sensors as seen at 90, 90', 91, 91' in FIG. 10, for example. The computer is programmed to send an actuating signal at 98 to the air and electrical devices as a control signal.

OPERATION

Figure 3:
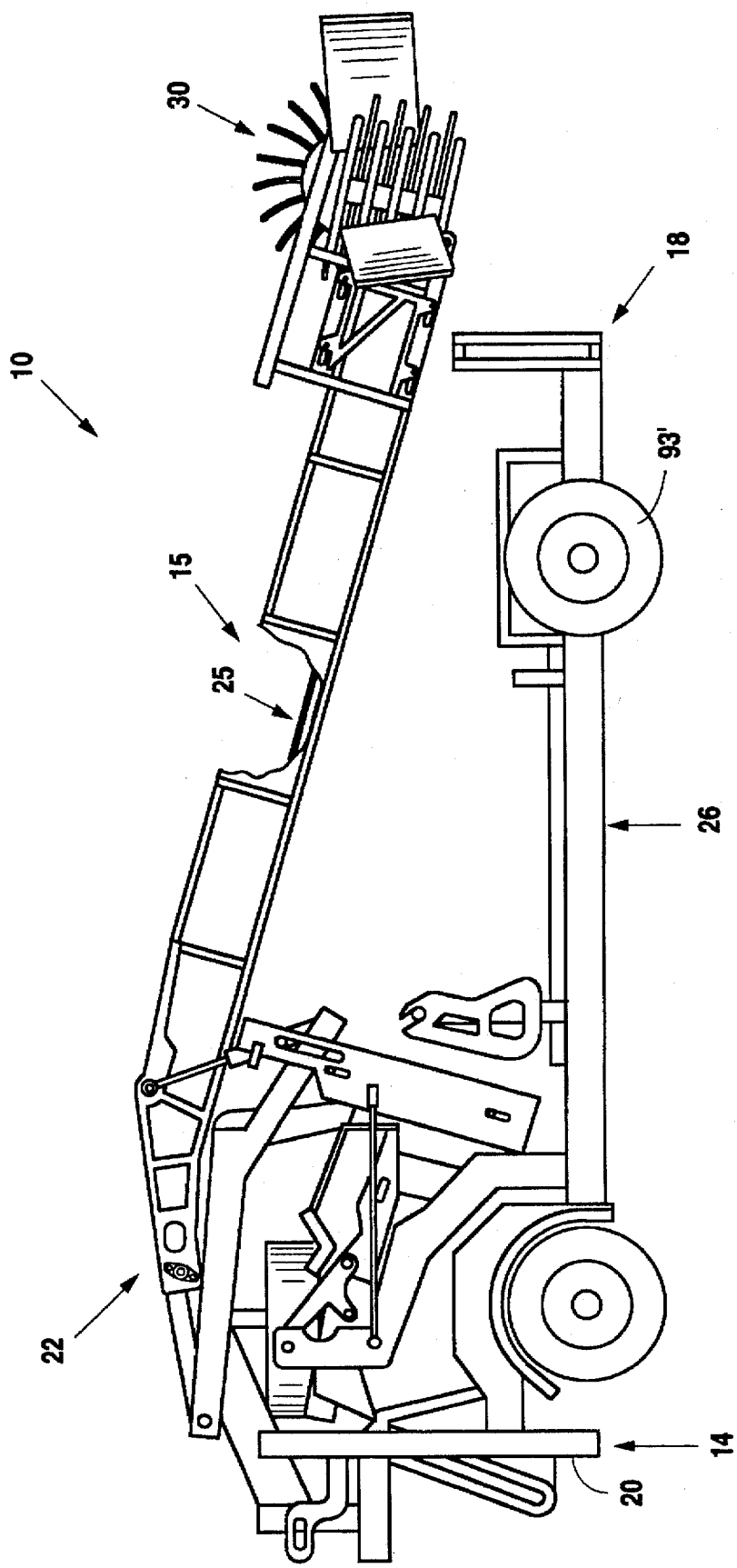
FIG. 3 is a side view showing the side opposite of FIG. 1, with the apparatus being in an alternate configuration.
Figure 4:
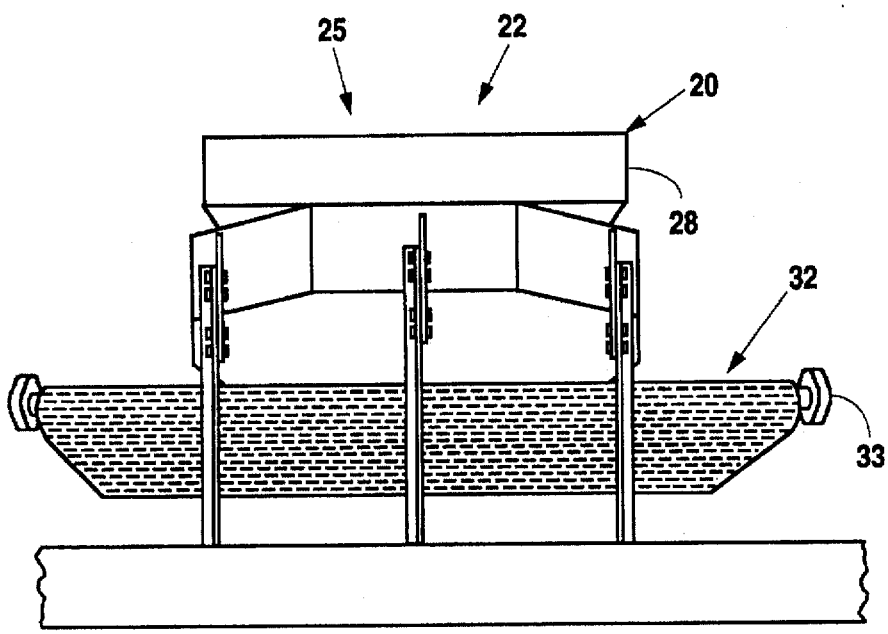
FIG. 4 is an isolated, fragmentary, detailed, front view of part of the apparatus disclosed in FIGS. 1–3.

In operation, the apparatus 10 of this invention preferably is in the form of the illustrated vehicle which can be driven along the road to a chicken house where the boom is pivoted from the stored position of FIG. 3 into the working position illustrated in FIGS. 1 and 2. After the vehicle has been driven into the chicken house, the rear wheel axle is manipulated to allow the rear wheels of the vehicle to be telescoped apart into the operative configuration of FIG. 2, thereby providing adequate room for manipulation of the coops that are supported for movement on the rear part 18 of the frame.

After the support frame apparatus of FIGS. 9 and 10 moves an empty coop into a lateral position (FIG. 9C) where it can be tilted as seen in FIG. 7 and 8, the gathering head 30 and the conveyors 25, 32, 38 and 42 are energized and the gathering head is moved into contact with the flock of chickens. This is achieved by the use of a remote control console (not shown) connected to the control panel at the computer 96, which is connected to control the action of the hydraulic motors and actuating cylinders of the gatherer, conveyor and boom positioner. The chickens encounter the rotating brushes of the gathering head 30 and are thereby caught and transported onto the boom conveyor 25. The caught chickens travel up the boom conveyor and through the turn table that forms the pivoted end of the boom 22, where they gravitate onto the intermediate conveyor system. There the chickens are transported to a last conveyor associated with the transfer divider and discharge means 46.

In FIGS. 1 and 2, together with other Figures of the drawings, the transfer divider and discharge means 46 is suitably arranged respective to the discharge end 40 of the third conveyor 38 for receiving chickens that are moved along intermediate conveyors 32 and 38, and thereby transferred thereinto. At the last conveyor, the moving accumulation of chickens are forced along a path leading into selected ones of the pairs of brushes 52 and thence into appropriate compartments of a tier in order to proportionately distribute the weight of chickens contained within the coop 76.

It should be noted that the two conveyors 32 and 38 of the intermediate conveyor system are mounted to pivot about a pivot point 42' that is arranged at the forward end of conveyor support member 41', while end 40 thereof is elevated vertically in order to be suitable positioned respective to the fourth conveyor 42, as already described herein.

During the time that the chickens are traveling along the intermediate conveyor system, the computer controlled oscillating vanes 59 control the flow path of the conveyed chickens which are evenly distributed by the oscillating vanes 59 as chickens move towards the last conveyor 42. Accordingly, there is always an appropriate number of chickens ready to be transported along one of the three parallel paths from the last conveyor leading into each of the compartments of a tier.

Between the time intervals that the carriage 43 of the transfer divider and discharge means 46 is sequentially elevated into alignment with each succeeding tier of the tilted coop, the brushes and last conveyor thereof stop rotation, while the brushes are pivoted out of the path of the coop. Thus the discharge means 46 is first moved into the lowermost of the five illustrated positions suggested in FIGS. 1, 7 and 8, with this action being controlled by the computer 96 of FIG. 1 which senses weight distribution as well as vertical position of the discharge means 46.

Note in FIGS. 1 and 8 that the intermediate conveyor discharge end is aligned with the second tier of the coop 76 while the last conveyor of the discharge means 46 is aligned to deliver chickens into the lowermost tier of the coop. Consequently, when the apparatus is moved into this operative position, chickens discharged from the intermediate conveyor harmlessly fall the short distance (which is only one compartment high) to the last conveyor during the filling of the lowermost tier of the coop. In this manner the last or fourth conveyor 42 is always suitably aligned to receive chickens conveyed from the discharge end of the third conveyor 38 of the intermediate conveyor system.

It should be noted that carriage frame is mounted to the same structure as other components of the transfer divider and discharge means 46 and therefore travels therewith along a path that is parallel to one another and as defined by the longitudinal slots of the guide 49. Furthermore it should be appreciated that the chickens discharged from the intermediate conveyors 32 and 38 are evenly distributed by the continuously oscillating vanes 59 by which the chickens are guided and transferred as they are conveyed along the intermediate conveyors and onto the last conveyor 42, with the relative position therebetween being optimally maintained by the complex linkage, shown in FIGS. 1, 2 and 6–8.

The load cells (FIG. 10) signal the computer 96 when the compartments of each tier is adequately filled with chickens, whereupon the counter-rotating brushes 51 stop rotation, and then pivot about shaft 58, thereby causing door closure 5 7 to engage and close the appropriate coop door, and removing the brushes from contact with the coops. The discharge means 46 immediately moves into alignment with the second tier, the counter-rotating brushes are pivoted back into the position of FIGS. 6–8, and the operation again resumes, thereby filling the second tier with an appropriate number of chickens. Next, the brushes again stop rotation and pivot back into the retracted position, thereby again clearing the coop while closing the second door, and thereafter moving into operative position respective to the third tier.

As the discharge means 46 moves from the second to the third tier, it will be noted that the J-hook 73 of FIG. 5 engages member 40' located at the rear of the intermediate conveyor system and carries the conveyor end 40 therewith, thereby always maintaining proper alignment between the four conveyors. This action continues until all of the tiers of the coop have been filled, whereupon the coop is then moved into upright position by retraction of the tilters 89. The coop is then manipulated back in to the position of FIG. 9A by means of the before described coop rotator and support frame 85 and the spaced parallel endless chain apparatus 88 where it is exchanged for an empty coop in the before described manner.

The multi-tiered coop 76 is of standard dimensions and has 5 horizontal tiers 78 superimposed on one another, with there being three adjacent compartments 77 in each tier 78, each of which are brought into registry with the three pairs of rotating brushes of the transfer divider 46, thereby aligning each compartment opening with one of the parallel paths of chickens flowing from the transfer divider means. The compartments 77 preferably have individual, spring loaded doors 79 that work with an over the center action so that they remain in either the open or closed position which they last were moved. Sometime a single door is provided across the entire opening into a tier 78.

Under normal conditions 1500 pounds of six pound fryers can be loaded into a single coop, with the chickens being distributed such that about 300 pounds of chickens is loaded into each tier, which calls for 50 chickens (50×6 pounds=300 pounds) to be divided among the three compartments of each of the tiers. Accordingly, approximately 17 six pound chickens are transported into a single compartment. Therefore, the three rows of chickens delivered into the three adjacent compartments of a tier by the transfer divider can be visualized as three parallel rows, each row being about 17 chickens in length. Hence, almost one chicken must be gathered each second at the gathering head 30 in order to fill the entire coop in less than 5 minutes. Further, either or both of the dual heads at 30 can be selectively operated to gather chickens from either or both sides of the gathering head. It will therefore be appreciated that another desirable feature of this invention is the allowance of a greater time interval that can be devoted to the careful mechanical gathering operation so that the caged chickens arrive at the processing plant uninjured.

FIGS. 9A, 9B and 9C illustrate the positioning and arrangement of the empty and full coops by the present invention, which speeds up this aspect of the operation. As particularly seen illustrated in FIG. 9A, during the operation of the present apparatus, and assuming that a coop 76−40 has been filled and rotated into a longitudinal position (F) respective to the frame 12, the fork-lift brings an empty (E) coop 76 which is deposited adjacent to the filled coop (F) , and then the fork lift engages the full coop 76' (F) and carries it to a truck trailer, leaving behind the empty (E) coop. As soon as the full coop has cleared the frame, and the rear gate closed, the computer is instructed to actuate the spaced parallel endless chain apparatus 88 (FIGS. 2 and 10) which lifts and moves the empty coop into position (E) of FIG. 9B. Then the empty coop is automatically lowered onto the coop rotator frame 80. Next, the frame 80 is pivoted into the lateral position of FIG. 9C, carrying the empty coop therewith. At this time the apparatus for tilting and weighing the coop 76, as seen at 89 and 90 in FIGS. 7 and 10, are pivoted into the elevated position so that the coop is engaged and lifted by the four load cells as it is tilted into a chicken receiving position, best seen illustrated in FIGS. 7 and 8.

As each successive tier of the coop accumulates approximately 300 pounds of chickens therein, the incoming load signal from 97 is sensed by the computer at 96 which instructs the panel 98 to stop rotation of the brushes and the last conveyor, then to pivot the brushes, and then to move the carriage to the next elevation that coincides with the next empty tier.

After all of the tiers of the coop are filled in the before described manner, the coop is returned to the upright position, and then pivoted by the support frame back into the longitudinal position at the rear of the frame 12 (at 26, see FIGS. 9A and 9C) where it is immediately engaged and lifted by the waiting forklift vehicle, which, by this time, has previously placed the next empty coop into the illustrated position of FIG. 9A, whereupon the before described process is repeated.

A safety gate is attached to and forms the terminal end of the vehicle. The gate must be open in order to access the coop storage area. A switch means is connected to interrupt the operation of the conveyors and the vehicle propulsion means while the gate is in the open position.

DESCRIPTION OF THE MODIFIED EMBODIMENT

Referring now to the modified embodiment shown in FIGS. 14–38 the modified apparatus 102 comprises in general a frame 104 that includes the main frame as well as other supporting framework, wheels 105 supporting frame 104, a chicken gathering apparatus 106 supported from frame 104 and which apparatus 106 is substantially of the same construction and operation as chicken gathering apparatus 30 of the principal embodiment, chicken coop handling means 108 for receiving and maneuvering multi-tiered chicken cages or coops 110 that are preferably of known construction, encased in screen or the like, and which coop handling means is for successively positioning each of the chicken coops 110 into a tilted position at a loading area 112, transporting means 114 for receiving gathered chickens C from chicken gathering apparatus 106 and delivering the gathered chickens C to loading area 112, and chicken loading means 116 at loading area 112 for loading chickens C into the chicken coops 110 at loading area 112.

Transporting means 114 includes boom conveyor means 120 having a receiving end 122 for receiving chickens C from chicken gathering means 106 and for moving the chickens from receiving end 122 to a discharge end 124 of boom conveyor means 120. Also, transporting means 114 includes transfer means 126 for receiving chickens C from boom conveyor means 120, for moving the chickens towards loading conveyor means 118, and for discharging the chickens onto loading conveyor means 118.

Transfer means 126 includes circular conveyor means 130 for receiving chickens C from the discharge end 124 of boom conveyor means 120. Circular conveyor means 130 is adapted to move chickens around a portion of the circular conveyor means and through a discharge opening 132 of the circular conveyor means. Also, transfer means 126 includes an transverse conveyor means 134 having an upper end 136, having a receiving area 138 for receiving chickens C from circular conveyor means 130, and having a discharge end 140. Transverse conveyor means 134 is adapted to move chickens C to the discharge end 140 of transverse conveyor means 134 for discharge of chickens C onto loading conveyor means 118. It should be understood that although transfer means 126 is shown as being two conveyor means, i.e., circular conveyor means 120 and transverse conveyor means 134, it will be understood that transfer means 126 may comprise one conveyor without departing from the spirit and scope of the present invention. For example, a single conveyor means can be utilized to extend from discharge end 124 of boom conveyor means 120 to the receiving end 141 of loading conveyor means 118 for transferring chickens from boom conveyor means 120 to loading conveyor means 118.

Each of the conveyor means shown, i.e., boom conveyor means 120, circular conveyor means 130, transverse conveyor means 134 and loading conveyor means 118, are of conventional construction. Thus, loading conveyor means 118 includes an endless belt or plastic chain 142 of known construction to those skilled in the art which extends over spaced apart rollers 144, 144' or the like, at least one of which is driven by suitable known means to cause the upper flight of chain 142 to move rearwardly at the appropriate times as will be better understood in the description to follow later in the specification. Transverse conveyor means 134 is similar in construction to that above described relative to loading conveyor means 118 to move the upper flight thereof towards the loading conveyor 118. Also, boom conveyor means 120 is similar in construction to that above described except that it preferably employs an endless rubber belt instead of a plastic chain, the upper flight of which moves rearwardly up the incline of boom 146 in a manner substantially similar to the principal embodiment. Circular conveyor means 130 is of known construction which includes an annular turn table 148 that is driven by suitable known means in a counterclockwise direction, as viewed from above (see FIG. 15), about a vertical axis 150. A cortically shaped member 152 is provided centrally of turntable 148 for causing any chickens C, which attempt to move off of the turntable 148 towards axis 150, to slide back down onto turntable 148. A guide shield 154 is provided around the outer edge of turntable 148 to keep the chickens from falling off of turntable 148. A first guide means 156 is supported from frame 104 adjacent discharge end 124 of boom conveyor 120 and extends over a portion of turntable 148 for guiding the chickens C onto turntable 148 as the chickens exit from boom conveyor means 120. A second guide means 158 is supported from frame 104 adjacent discharge opening 132 and extends over a portion of turntable 148 for guiding the chickens off of turntable 148 onto transverse conveyor means 134.

Transverse conveyor means 134 includes an endless conveyor chain 160 which extends over spaced rollers 162, 162' or the like that are rotatably mounted adjacent the opposite ends of an elongated rigid frame 164. The lower end of frame 164 is pivotally attached as at 166 to the supporting framework 168 of loading conveyor means 118. Guide means 170 is provided for transverse conveyor means 134 to guide the movement of transverse conveyor means 134 to keep receiving area 138 of transverse conveyor means 134 adjacent discharge opening 132 of circular conveyor means 130 and to keep the discharge end 140 of transverse conveyor means 134 adjacent receiving end 141 of loading conveyor means 118 as loading conveyor means 118 is moved from a lowermost position shown as at 118a (see FIG. 24), where loading conveyor means 118 is stopped adjacent the lowermost tier 172a of a particular chicken coop 110a being loaded, through successive positions at 118b, 118c, 118d & 118e where loading conveyor means 118 is stopped at successive corresponding tiers 172b, 172c, 172d, & 172e, respectively of the particular chicken coop 110 being loaded. Guide means 170 has an upper end 174 and a lower end 176, and guide means 170 includes restraining means 178 at upper end 174 preferably in the form of a roller 180 attached to frame 164 and rollingly engaged in a slot 182 provided in a member 184 that is fixedly attached to frame 104.

Elevator means 186 movably supports loading conveyor means 118 for movement between the lowermost position at 118a of loading conveyor 118 and the uppermost position at 118f thereof. There is an upper limit switch 186' and a lower limit switch 186" for elevator means 186. Elevator means 186 includes a spaced pair of square tubular rails 188, 188' upon which loading conveyor means 118 is movably mounted by means of a plurality of rollers 190 (see FIG. 22) rotatably mounted on supporting framework 168 by suitable known means and a pair of which rollers respectively engage opposite sides of each of the tubular rails. Also, elevator means 186 includes chains 192 respectively mounted on the outer faces of rails 188 and which chains 192 respectively engage cog wheels 194 (only one of which is shown) that are fixedly mounted on axle 196 which in turn is rotatably mounted from supporting framework 168 and which is rotatably driven by suitable means such as motor 198 to move loading conveyor means 118 selectively up and down on the rails to the positions desired by the operator and as will be more fully understood by the description to follow later in the specification.

Referring particularly to FIGS. 24 and 25 and the foregoing, it will be understood that since the lower end of transverse conveyor means 134 is coupled to the supporting framework 168 of loading conveyor means 118 by the pivot means as at 166 and the upper end of transverse conveyor means 134 is restrained in its movement by roller 180 in slot 182, as the loading conveyor means 118 and the lower end of transverse conveyor means 134 is moved by elevator means 186 the upper end of loading conveyor means 118 is moved also. The particular angular relationship of slot 182 and tubular rail 188 is chosen so that regardless of the loading position, 118a, 118b, 118c, 118d or 118e at which the loading conveyor means 118 is stopped the receiving area 138 of transverse conveyor means 134 will remain in substantially the same place as best seen in FIG. 24 so that the receiving area 138 will always be properly positioned for the receipt of chickens from circular turntable 148.

In addition to loading conveyor means 118 and elevator means 186, chicken loading means 116 includes deflector means 200a, 200b, and 200c (see particularly FIGS. 16 and 17) respectively attached to the supporting framework 168 of loading conveyor means 118 at spaced intervals along loading conveyor means 118 for respectively being positioned adjacent the compartments 202a, 202b, and 202c of the particular tier 172a, 172b, 172c, 172d, or 172e of chicken coop 110 corresponding to the particular stopped position 118a, 118b, 118c, 118d, or 118e of loading conveyor means 118 for deflecting chickens C into the desired compartment 202a, 202b, or 202c of the chicken coop 110 at loading area 112. It will be understood that conveyor belt 142 moves the chickens to the right as viewed in FIGS. 16 and 17, and as shown by the arrow A. Each of the deflector means 200b and 200c are pivotally attached to supporting framework 168 by suitable known means for pivot about substantially vertical axes, shown as at 203 and 204, between by-pass positions respectively shown as at 200b' and 200c', adjacent the outer fence 210 of loading conveyor means 118, and deflecting positions respectively shown as at 200b" and 200c" at an angle relative to the path of loading conveyor means 118 for deflecting chickens C into a desired compartment 202. The means for pivoting deflectors 200b and 200c are substantially the same and the following description of the means for pivoting deflector 200b will suffice for both. Deflector 200b is pivoted by means of a cylinder 205 that is operably coupled at its base end to frame 168 of loading conveyor means 118 and at its piston end to an arm 206 that in turn is fixedly attached to deflector 200b. The deflector means 200a is fixedly mounted on supporting framework 168 at an angle which corresponds to the deflecting positions 200b" and 200c" of deflector means 200b and 200c. The deflectors 200a, 200b and 200c are preferably formed of plastic and have a smooth surface so that the chickens slide against deflectors 200a, 200b and 200c and into the coops 110.

From the foregoing it will be understood that in order to load compartment 202a first, deflector means 200b and 200c should be in the by-pass positions 200b', 200c', respectively. Then after compartment 202a is loaded with chickens C, deflector means 200b is moved into deflecting position 200b" to deflect chickens C into compartment 202b. Next, in order to load compartment 202c, deflector means 200c should be moved into deflecting position 200c" so that the chickens C traveling down loading conveyor means 118 in the direction of arrow A will be deflected into compartment 202c by deflector means 200c. Also, it should be understood that during the loading of the chickens C into the various compartments the doors 212 of the compartments 202 at the particular tier 172 being loaded should be in an open position so that the doors 212 act as a walkway for the chickens at the entrance to the compartment being loaded. The doors 212 are hinged at the bottom edges of the compartment for pivot about a horizontal axis so that the doors act as a convenient walkway as above described. As best seen in FIG. 38 arms 214 are fixedly mounted on supporting framework 168 of loading conveyor means 118 and project outwardly from the supporting framework in the path of doors 212 of coups 110. There are three arms 214, one for each vertical row of compartments 202. Arms 214 are pivotally attached to supporting framework 168 in such a manner that the arms will pivot only in an upward direction when the loading conveyor means 118 is moved upwardly from one position 118 to the next. As for example, after a particular tier 172 has been loaded and loading conveyor means 118 is being moved upwardly to the next tier for loading, arms 214 will push doors 212 of the loaded tier upwardly to close those doors, and so on as each tier is loaded and loading conveyor means 118 is moved upwardly to the next tier. FIG. 38 shows the lower door 212 being engaged by an arm 214 as loading conveyor means 118 is being moved from the lowermost tier of coop 110 upward to the next tier. Doors 212 are provided with an over-center type of mechanism so that when the doors are moved upwardly beyond a certain point the doors will snap shut. However, when loading conveyor means 118 is moved downwardly, arms 214, if they engage any open doors 212, will have no effect on the position of the open doors due to the fact that the arms will simply pivot upwardly.

Chicken coop handling means 108 includes, in general, first coop moving means 216 disposed on one side of apparatus 102, with first coop moving means 216 including first roller means 218 for movably supporting coops 110 for movement of coops 110 from a first position shown as at 110a (see FIG. 18) adjacent the rear of apparatus 102 to a second position 110b (see FIG. 15) forwardly of first position 110a; first chain drive assembly means 220 for successively transporting coops 110, that are resting thereon, transversely of apparatus 102 from second position 110b towards a third position 110c; first lifting means 222 movable between a lowered position below first chain drive assembly means 220 in which lowered position a coop 110 rests on first roller means 218 and a raised position above first roller means 218 in which first chain drive assembly means 222 is raised above first roller means 218 so that the coops 110 at second position 110b when first lifting means 222 is in said raised position will be transported transversely of apparatus 102 by first chain drive assembly means 220 towards third position 110c on the opposite side of apparatus 102 from second position 110b; second chain drive assembly means 224 for successively receiving the coops 110 being transported by first chain drive assembly means 220 and being adapted for successively transporting a coop 110 into third position 110c when the coop is resting thereon and second chain drive assembly means 224 is in an operating mode; second coop moving means 226 disposed on the opposite side of apparatus 102 from first coop moving means 216 including second roller means 228 for movably supporting the coops after the loading thereof; second lifting means 230 movable between a lowered position below second chain drive assembly means 224 in which lowered position a coop 110 is adapted to rest on a second roller means 228 and a raised position above second roller means 228 in which second chain drive assembly means 224 is raised above second roller means 228 so that the coops 110 received from first chain drive assembly means 220 will be successively transported transversely of apparatus 102 into third position 110c by second chain drive assembly means 224; pivotable carriage means 232 supporting second chain drive assembly means 224 and second lifting means 230 for receiving and supporting a coop 110 in the upright third position 110c when the coop is moved to third position 110c; tilting means 234 operably coupled to carriage means 232 for movement of carriage means 232 and a coop 110 supported thereby from the upright third position 110c to a tilted fourth position 110d for loading the coop 110 with chickens C, and subsequently for movement of carriage means 232 and the loaded coop 110 back to the upright third position 110c of carriage means 232 and the coop 110 supported thereby for subsequent movement of second lifting means 230 into said lowered position thereof so that the lowered coop 110 is resting on second roller means 228; and ejecting means 235 for engaging the loaded coop 110 when carriage means 232 and the loaded coop 110 are moved back to the upright said third position and second lifting means 230 is moved to said lowered position for ejecting the loaded coop 110 on the rollers 237 of second roller means 228 away from carriage means 232 towards the rearward end of the apparatus 102. Cage drive wheel means that is preferably in the form of a driven wheel 238 is rotatably mounted from frame 104 along the pathway of the coop 110 which is being ejected, further aids in the rearward movement of the loaded coop 110 to the rearward end of apparatus 102 for removal of the loaded coop 110 from apparatus 102.

Reference to some of the parts of chicken coop handling means 108 which were heretofore described in general will now be referred to more specifically, as follows:

First roller means 218 are preferably simply in the form of a plurality of non-driven rollers 240 which are rotatably mounted from frame 104 so that coops 110 may be loaded onto the rollers 240 by a forklift vehicle or the like and then each coop is adapted to be moved forwardly as by hand from first position 110a into second position 110b.

First chain drive assembly means 220 preferably includes a framework 241 upon which is mounted a pair of spaced apart endless chains 242, 242' each of which extends over suitable spaced apart sprocket wheels mounted on axles, not shown, but well known to those skilled in the art. Hydraulic motors 244 are respectively coupled to chains 242, 242' by suitable well known means to drive the upper horizontal flights of chains 242, 242' at the same speed transversely of apparatus 102 towards the right side of the apparatus 102. A pair of idler sprockets 246, only one of which is shown, preferably are respectively provided for chains 242, 242' to take up the slack in the chains.

First lifting means 222 movably supports framework 241 and first chain drive assembly means 220 from a base 248 that in turn is supported from frame 104. First lifting means 222 is preferably in the form of a plurality of airbags 250, known to those skilled in the art, which are adapted to be extended by air under pressure to lift first chain drive assembly means 220 from a lowered position below rollers 240 to a raised position in which first drive assembly means 220 is raised above rollers 240.

Second chain drive assembly means 224 and second lifting means 230 are of substantially the same construction as first chain drive assembly means 220 and first lifting means 222 and operate in substantially the same manner. Therefore the above description of the structure and operation of first chain drive assembly means 220 and first lifting means 222 should suffice for both. The only difference is in the fact that the spacing between the endless chains 242, 242' of first chain drive assembly means 220 is preferably greater than the corresponding spacing between the endless chains 251, 251' of second chain drive assembly means 224 so that there will be no interference between chains 251,251' and chains 242,242'. Also, instead of the base 252 of second chain drive assembly means 224 being attached to frame 104, base 252 is fixedly attached to pivotable carriage means 232 adjacent the bottom portion of the carriage means 232 so that second chain drive assembly means 224 and second lifting means 230 will move with pivotable carriage means 232 as it is pivoted, as well as some of the rollers 237 of second roller means 228 that are attached to the bottom portion of carriage means 232 and which move with the carriage means 232 as it is pivoted.

Pivotable carriage means 232 preferably includes an open frame 254 which is large enough to receive a chicken coop 110 and is preferably pivotally suspended at the top thereof from a horizontal cylindrical support member 256 that extends fore and aft of apparatus 102. Frame 254 is open at the rearward end and inner side thereof to allow passage of the coops 110 therethrough at the appropriate times as will be understood from the description to follow later. Support member 256 is fixedly supported at the opposite ends thereof from frame 104. The means for pivotally suspending carriage means 232 preferably includes bearing means 258 that embrace cylindrical support member 256 adjacent the opposite ends thereof and are attached to frame 254.

Tilting means 234 preferably includes an arm 260 that is fixedly attached to frame 254 at one end thereof and the other end is pivotally coupled to the piston end 262 of a hydraulic cylinder 264 that has its base end, not shown, pivotally coupled to frame 104. It will be understood that extension of hydraulic cylinder 264 is effective to move frame 254 to the tilted position shown in FIGS. 21–24 and retraction of hydraulic cylinder 264 is effective to move frame 254 to an upright position wherein the rollers 237 on carriage means 232 align with the remaining rollers 237 on frame 104 so that when second lifting means 230 is moved to a lowered position as for example after a coop 110 is filled with chickens C the coop will rest on rollers 237 and be ready to be ejected out the rearward end of frame 254 by ejecting means 236.

Ejecting means 236 preferably includes a cage eject cylinder means 266 which has it's base end 268 attached to frame 104 and has a plate 270 attached to the piston end 272 of cylinder means 266 so that when the piston is extended plate 270 will push against the loaded coup 110 and move the loaded coop rearwardly on rollers 237 towards the rearward end of apparatus 102. Then driven wheel 238 will cause the loaded coop 110 to complete the movement of the coop to the rearward end of apparatus 102 for subsequent removal by a forklift vehicle or the like.

Figure 22:
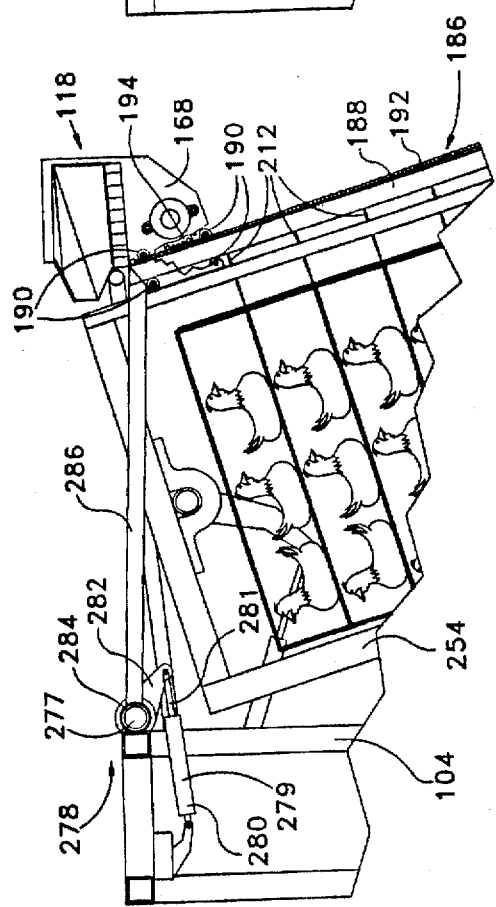
FIG. 22 is a fragmentary sectional view of a portion of that shown in FIG. 21 and with portions broken away and removed for purposes of illustration.
Figure 26:
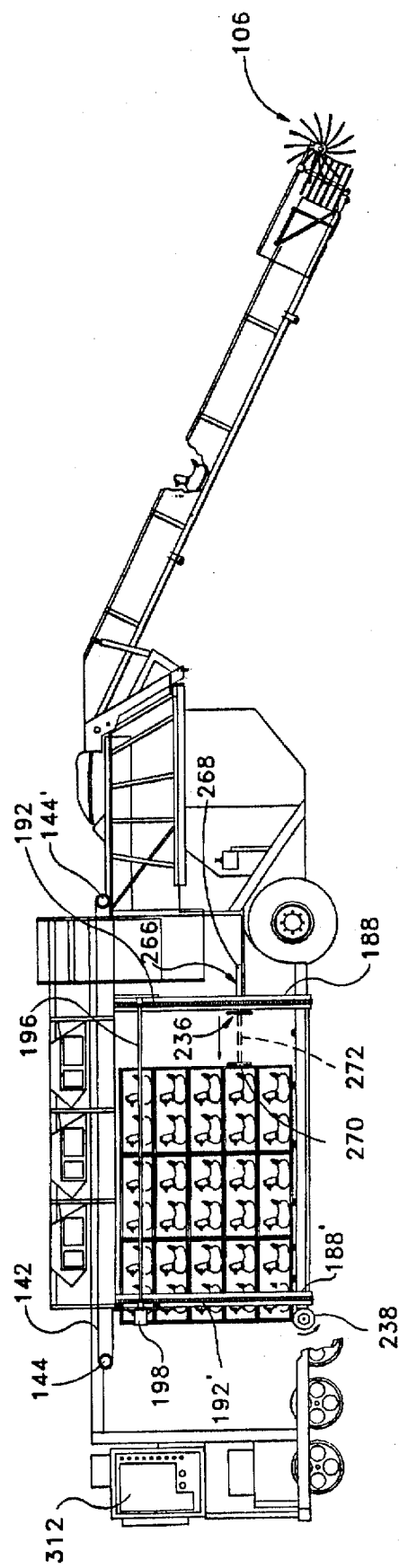
FIG. 26 is a view similar to FIG. 14 and with parts being broken away to show the ejecting means for a loaded coop.

Elevator means 186 and loading conveyor means 118 which is coupled thereto for movement upwardly and downwardly on elevator means 186, is shown in FIGS. 21–24 in an in-use position, which, as will be best seen in FIGS. 21, 22 and 24 is an angular position to match the heretofore mentioned tilted position of frame 254 for loading chickens C. To secure elevator means 186 and loading conveyor means 118 safely in the in-use position a rod 276 is placed between the lower portion of elevator means 186 and frame 104, as best seen in FIGS. 21, 24. Elevator means 186 and loading conveyor means 118 are preferably pivoted as at 277 (see FIGS. 22 and 23) and pivoting means 278 is provided for pivoting elevator means 186 and loading conveyor means 118 between the tilted in-use position and an upright position for transporting apparatus 102 from one place to the next. Pivoting means 278 includes a hydraulic cylinder 279 coupled at its base end 280 to frame 104 and coupled at its piston end 281 to an arm 282 which is fixedly attached to a horizontally disposed cylindrical member 284 that in turn is pivotally mounted from frame 104 by suitable means such as bearings, not shown, for pivot about horizontal axis 277. Cylindrical member 284 is fixedly attached to one end of an elongated rigid member 286. The opposite end of member 286 is rigidly attached to supporting framework 168 of elevator means 186 so that as piston 281 of cylinder 279 is retracted arm 282 is rotated clockwise as viewed in FIGS. 22 and 23 which rotates rigid arm 286 therewith to move loading conveyor means 118 and elevator means 186 to a transporting position (not shown) in which elevator means 186 is in an upright position and loading conveyor means 118 is tilted downwardly. Then, when piston 281 is extended elevator means 186 and loading conveyor means 118 are moved to the in-use positions shown in FIGS. 21–24.

Figure 18:
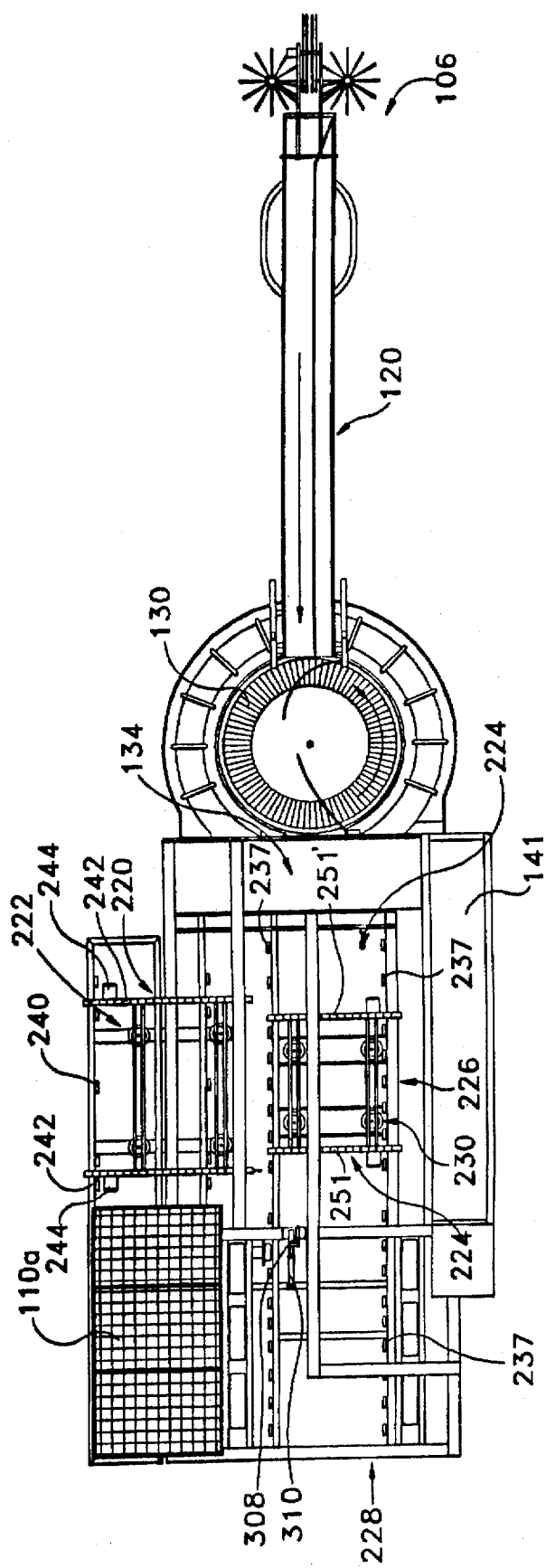
FIG. 18 is a view similar to FIG. 15 but with some of the coops having been removed for purposes of illustration.
Figure 23:
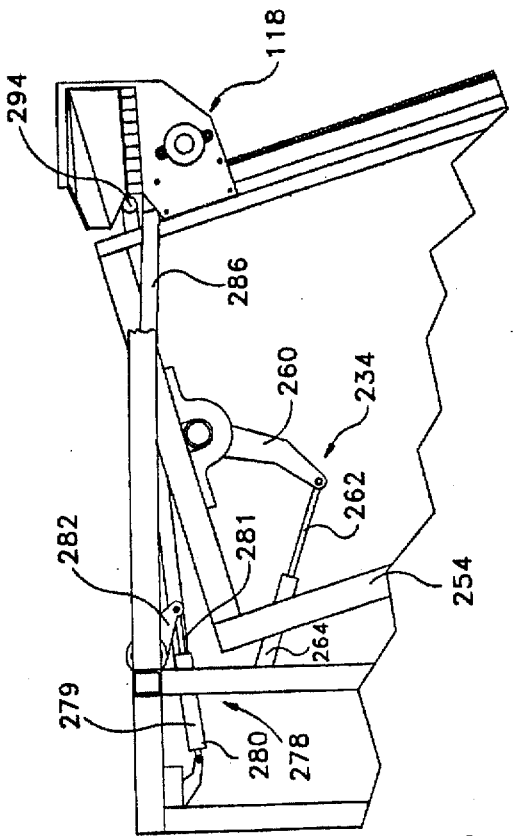
FIG. 23 is a view somewhat similar to FIG. 22 but with the coop being removed.
Figure 28:
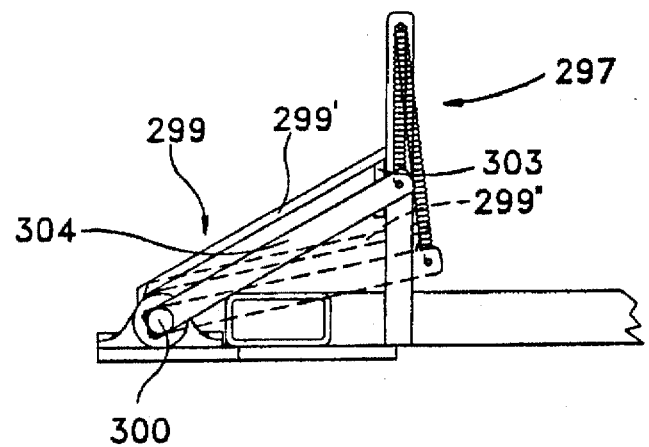
FIG. 28 is a an enlarged broken away portion showing one of the units of the holding means for the coops when in a tilted position.
Figure 29:
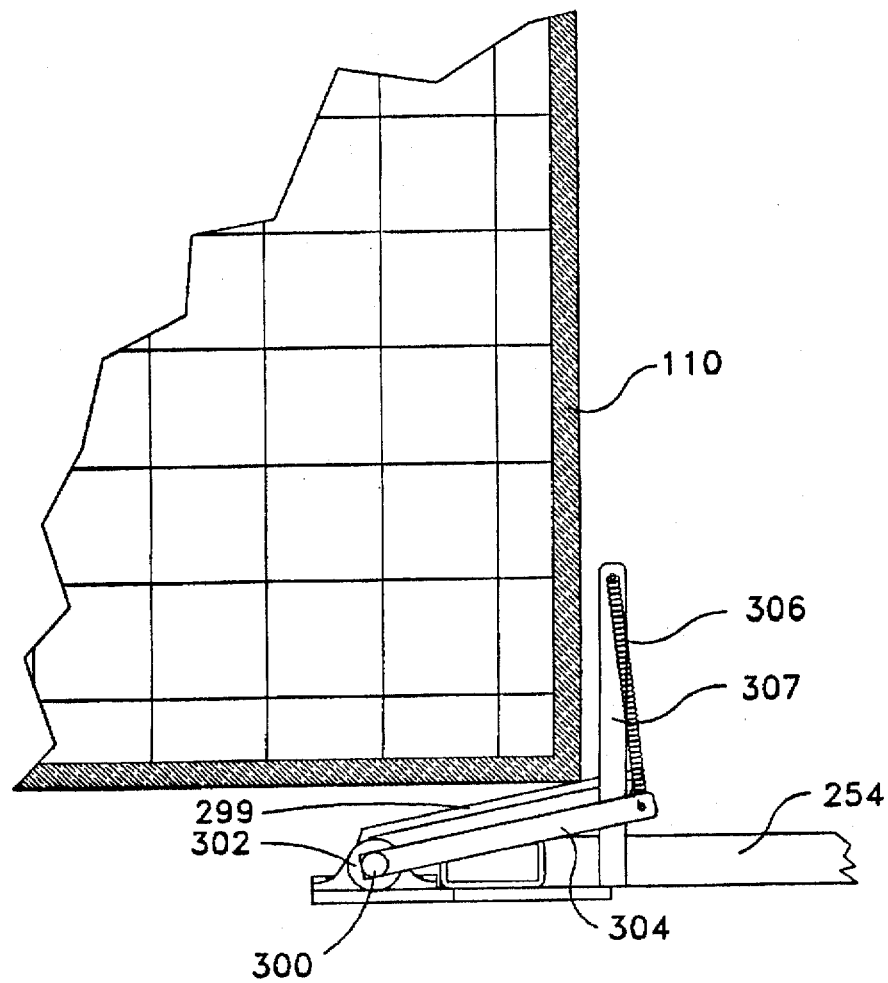
FIG. 29 is a view similar to FIG. 28 and showing a fragmentary portion of a coop contacting one of the units of the holding means during the initial phases of the coop's entrance into the pivotable carriage.
Figure 30:
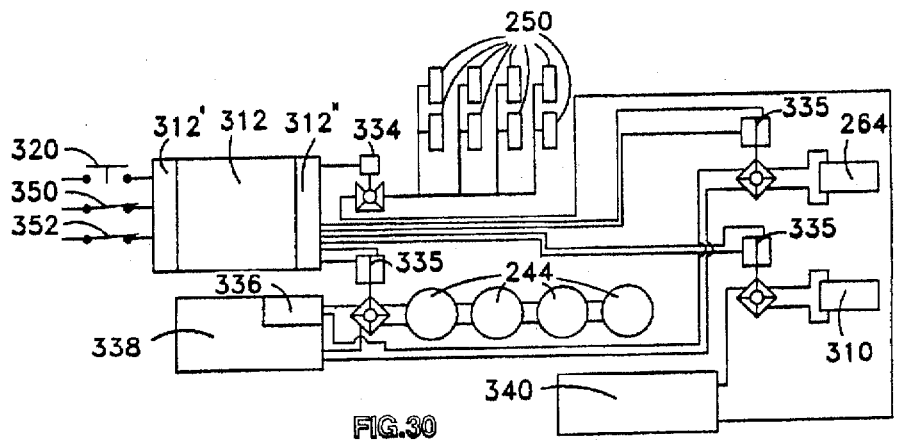
FIGS. 30–37 are flow diagrams showing the relationship of the controller and the hydraulic and electrical system for the various units controlled by the controller.
Figure 31:
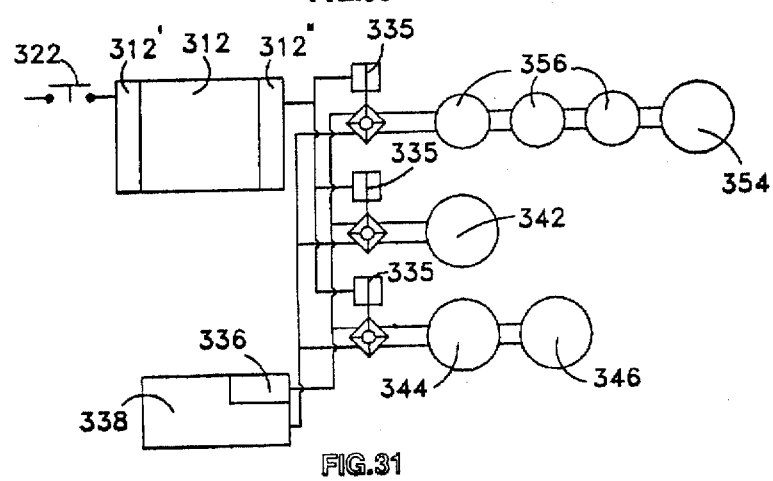
Figure 32:
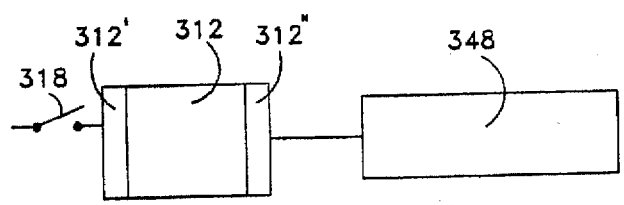
Figure 33:
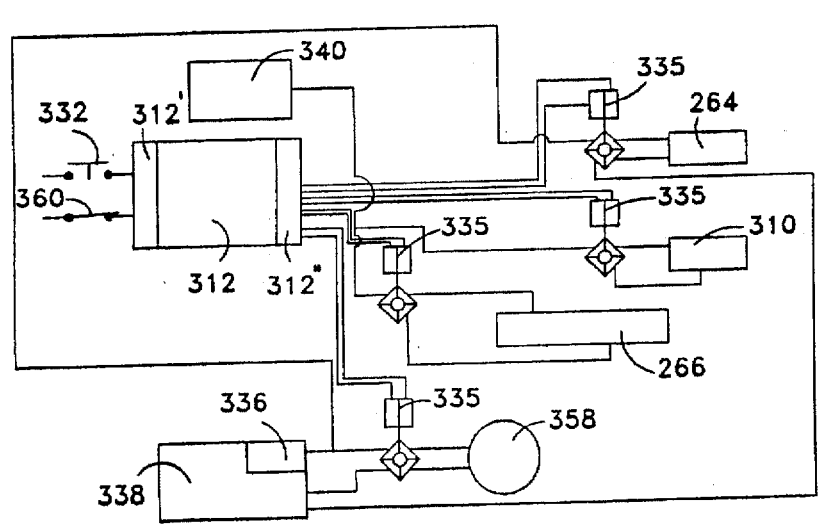
Figure 34:
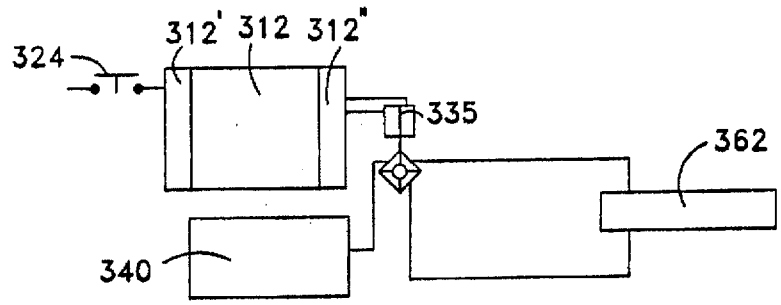
Figure 35:
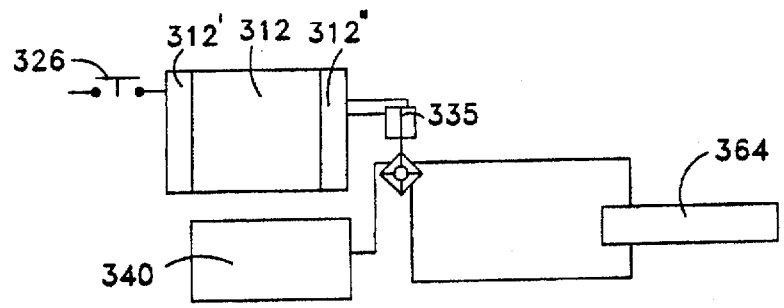
Figure 36:
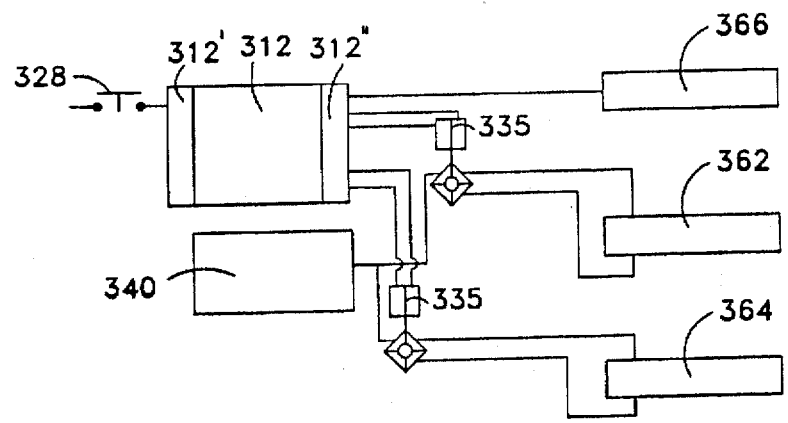
Figure 37:
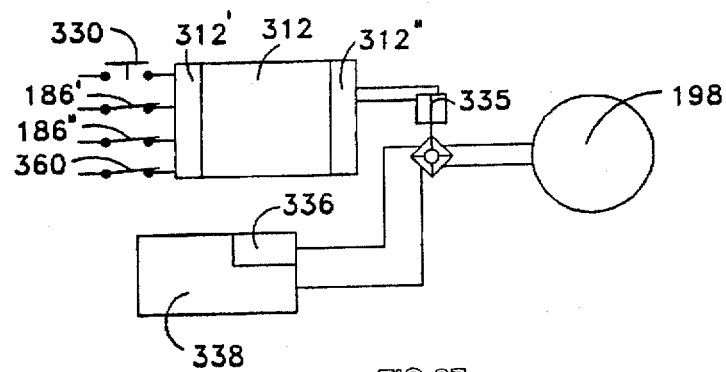

Holding means 296 is preferably provided for holding each coop 110 onto frame 254 during the tilting of the frame. Holding means 296 preferably includes a pair of holding units 297, 298, with holding unit 297 being on one end of frame 254 and holding unit 298 being on the opposite end of frame 254. Units 297 and 298 are substantially identical except that they are mirror images of one another and the following description of holding unit 297 should suffice for both (see FIGS. 17, 28, and 29). Unit 297 includes a plate 299 pivotally mounted for pivoting about a vertical axis by suitable means such as a being fixedly attached to a vertical rod 300 that in turn is pivotally mounted in bearings 302 (only one of which is shown) that are fixedly mounted on frame 254. Plate 299 includes an outwardly extending portion 303 at the distal end of the main body portion of the plate 299 and fixedly attached to the main body portion of the plate. An arm 304 is fixedly attached at one end to rod 300 and is attached at the opposite end to one end of a tension spring 306. The opposite end of spring 306 is attached to a member 307 that in turn is fixedly attached to frame 254 so that plate 299 is biased into the path of the coops 110. Plate 299 is movable by coops 110 from an at rest position 299' to a depressed position 299" as the coops enter carriage means 232. FIG. 28 shows the at rest position 299' and the depressed position 299". FIG. 29 shows the plate 299 being depressed by a coop 110 as the coop enters carriage means 232. After the coop 110 completely enters carriage means 232 the distal edge of plate 299 and portion 303 will snap in behind the coop in position to hold the coop against unwanted removal from carriage means 232. Also, as best seen in FIG. 18, a pin 308 which is mounted on and actuated by the piston of a hydraulic cylinder 310 that is mounted from frame 104 is effective to move pin 308 to an extended position behind the coop 110 (as will be better understood in the operation of apparatus 102 to be described later in the specification) to securely hold the coop in place against unwanted removal from carriage means 232 when frame 254 is tilted.

Figure 27:
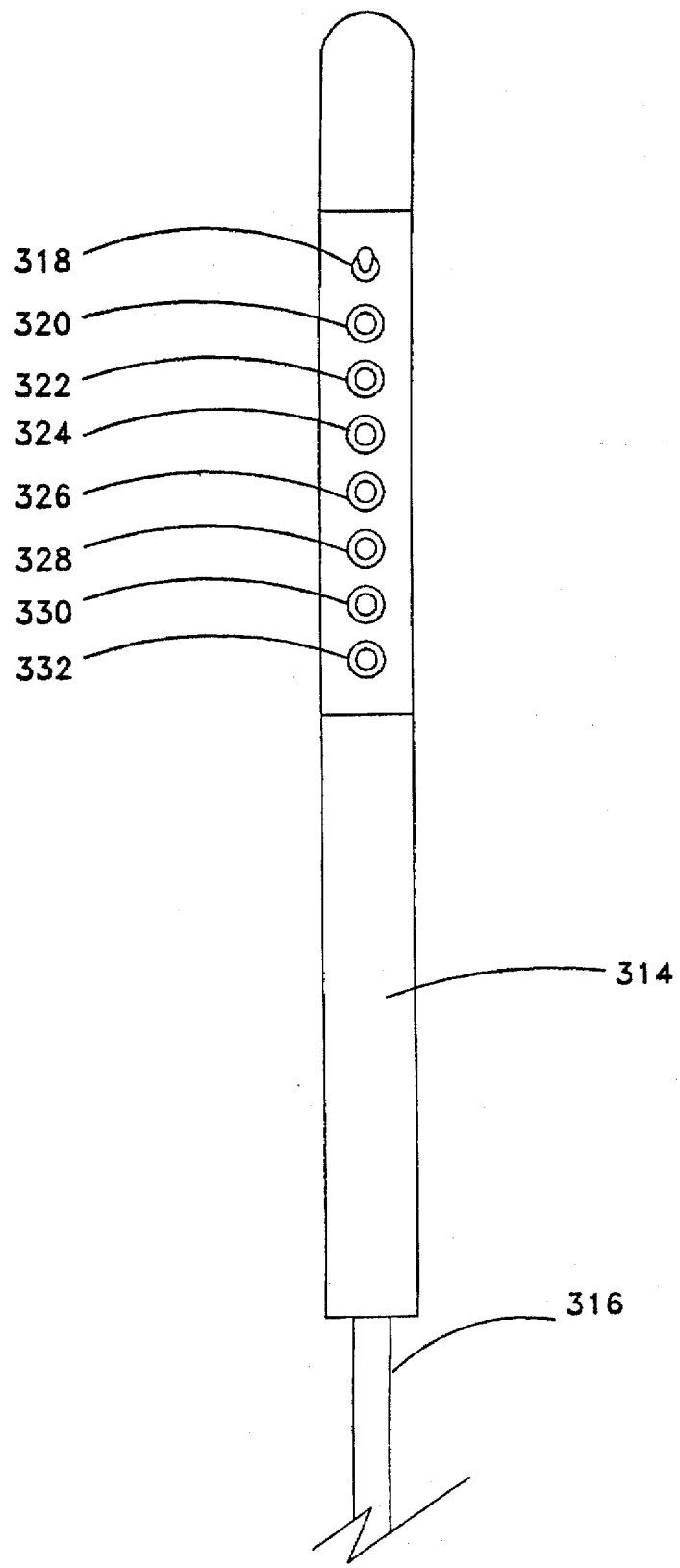
FIG. 27 is an enlarged view of the remote control wand and a fragmentary portion of the attached cable.

A suitable controller 312, which is preferably in the form of an Allen Bradley SLC 500 programmable controller with the input thereto being made by an operator actuated input device preferably in the form of an operator actuated remote control console or wand 314 connected to controller 312 by a control cable 316. As best seen in FIG. 27, wand 314 has a plurality of switches thereon for the operator to give the desired directions to controller 312. The switches are as follows, the buttons of which are appropriately labeled: "Freeze" switch 318, "Inject" switch 320, "Start" switch 322, "#1 Cage Full" switch 324, "#2 Cage Full" switch 326, "#3 Cage Full" switch 328, "Next Level Switch" 330, and "Eject" switch 332.

Referring now to the flow diagrams FIGS. 30–37, in addition to those parts previously referred to the following is a list of those additional parts shown in FIGS. 30–37: solenoid valve 334; dual operated solenoid valves 335; hydraulic pump 336; hydraulic reservoir 338; accumulator 340; drive motor 342 for turn table 148; drive motor 344 for transverse conveyor means 134; drive motor 346 for loading conveyor means 118; box 348 indicating "no output, all activity ceases"; limit switch cage stop 350; limit switch cage tilt 352; catch conveyor drive motor 354; boom conveyor drive motor 354; catch head drive motors 356; cage exit drive wheel motor 358; limit switch cage stop 360; #2 deflector actuator 362; #3 deflector actuator 364; box 366 indicating "conveyor output stopped"; and drive motor 198 for elevator means 186.

OPERATION OF MODIFIED EMBODIMENT

Figure 15:
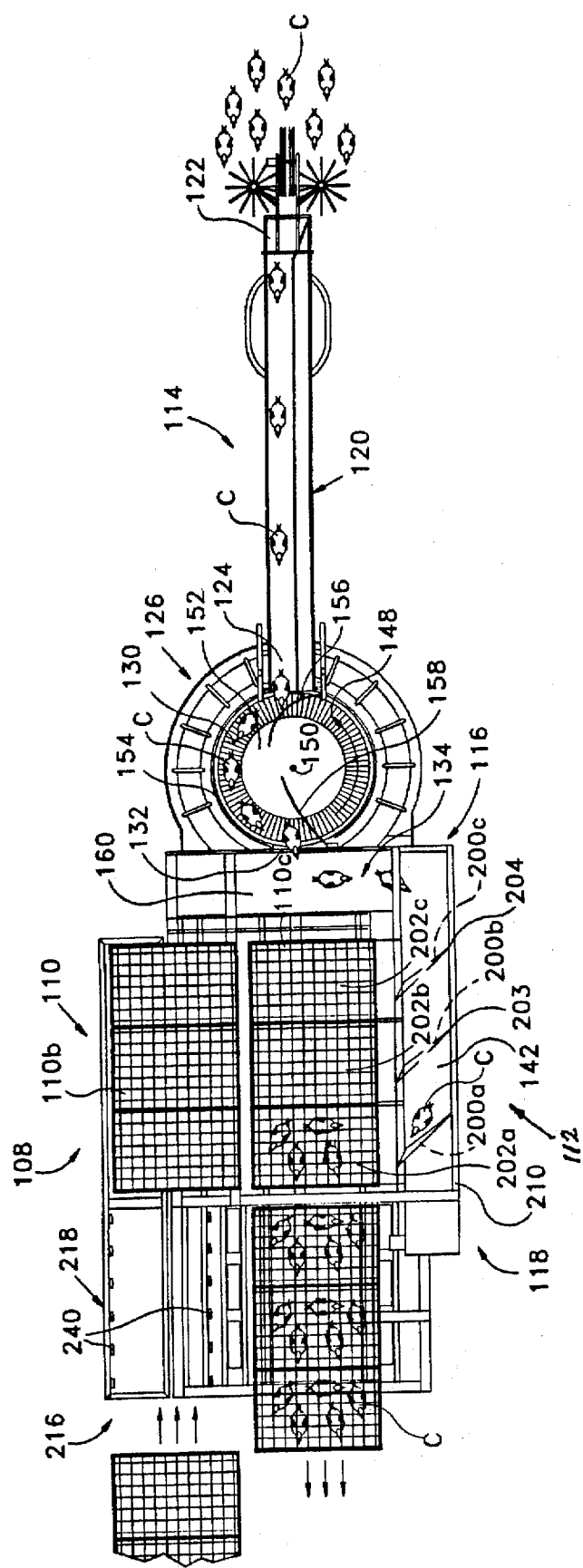
FIG. 15 is a top view of the apparatus of FIG. 14 showing coops in various positions.

In the use of modified apparatus 102, as in the case of apparatus 10, apparatus 102 is driven to a chicken house for gathering chickens. Having arrived at the chicken house the apparatus 102 is set up and operated as follows:

Elevator means 186 is pivoted to the "in-use" position by actuating hydraulic cylinder 279 and rod 276 is put in place. Next the fork lift operator loads a chicken coop 110 onto rollers 240 at a first position 110a of the chicken coop best seen in FIG. 18. The chicken coop at first position 110a is then moved manually on rollers 240 forwardly on modified apparatus 102 into a second position shown as at 110b, as best seen in FIG. 15.

The next step is the closing of inject switch 320 which causes controller 312 to go through a timed and switched sequence. The first thing that happens in the sequence is that the solenoid 334 that controls air bags 250 is energized causing the air bags to inflate and raise the upper flight of chains 242, 242' upwardly above rollers 240 and raise the upper flight of chains 251, 251' above rollers 237. After a time delay for filling bags 250 the solenoid 335 that controls the chain drive hydraulic motors 244 is energized which causes chicken coop 110 to be moved into a third position 110c (see FIG. 15) on the opposite side of apparatus 102 from second position 110b. As coop 110 moves into third position 110c the coop hits limit switch 350 to turn off chain drive motors 244 and to turn off the solenoid 334 that controls air bags 350. A time delay is begun in order to allow air bags 250 to deflate. After bags 250 are vented when the solenoid 334 that controls air bags 250 is de-energized. Next in the sequence, the solenoid 335 that controls tilt cylinder 264 is energized which causes carriage means 232 to be rotated into a tilt or loading position to carry coop 110 therewith to a tilted fourth position 110d in which the coop is ready for being loaded with chickens C. As coop 110 moves into fourth position 110d the coop hits limit switch 352 which causes the solenoid 335 that controls pin cylinder 310 to be actuated and pin 308 to extend. Pin 308 securely holds carriage means 232 in the coop loading position. Once coop 110 is tilted and locking pin 308 is extended, the coop rests on holding means 296 which physically holds the coop 110 from sliding off carriage means 232 when the carriage means is in the tilted loading position. The doors 212 of the coop 110 at the tilted fourth position 110d are then opened. Apparatus 102 is now ready to start harvesting chickens. The start switch 322 is closed and the chickens C are harvested by the chicken gathering apparatus 106 which is substantially the same in construction and operation as the first embodiment described earlier in the specification and therefore the description thereof need not be repeated here. After the chickens C have been gathered by gathering apparatus 106 they are conveyed by the transporting means 126 to the loading conveyor means 118, as best seen in FIG. 15. More specifically, the chickens C are conveyed up boom conveyor means 120, around a portion of circular conveyor means 130, and down transverse conveyor means 134 to loading conveyor means 118, where the chickens are conveyed rearwardly on the belt 142 of loading conveyor means 118.

Figure 14:
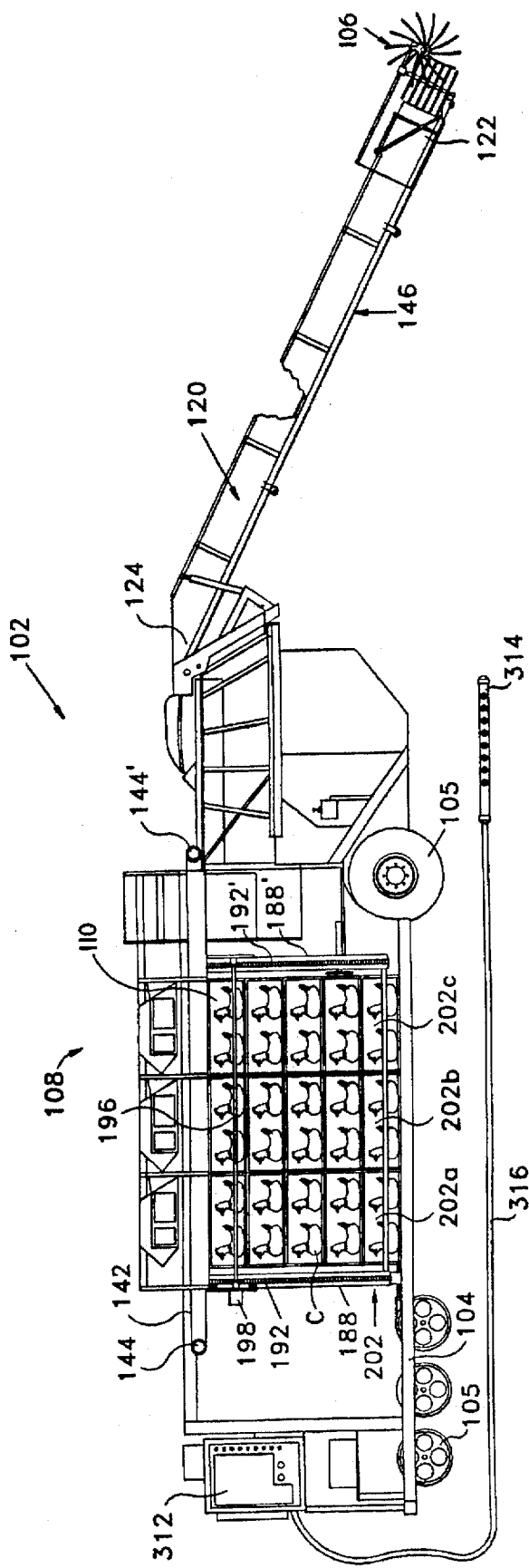
FIG. 14 is a side elevational view of the modified apparatus of the present invention with a chicken coop shown loaded with chickens, and with portions of the apparatus and chicken coop being omitted for purposes of illustration.

The coop 110 at loading area 112 is preferably loaded starting at the lowermost tier 172a of the coop and loading the compartment 202a of the lowermost tier 172a first. With deflectors 200c and 200b respectively being in the by-pass positions 200c' and 200b' (see FIG. 17) and with loading conveyor belt 142 moving to the right as viewed in FIG. 17 (see arrow A) the chickens will be deflected into compartment 202a of tier 172a by deflector 200a. After compartment 202a is full, the operator closes switch 324 by pushing on the corresponding button ("#1 cage full") on wand 314, which causes deflector 200b to move to deflecting position 200b" so that chickens will be deflected into compartment 202b. Then, after compartment 202b is full, the operator closes switch 326 by pushing on the corresponding button ("#2 cage full") on wand 314, which causes deflector 200c to move to deflecting position 200c" so that chickens will be deflected into compartment 202c. Finally, after compartment 202c is full, the operator closes switch 328 by pushing on the corresponding button ("#3 cage full") on wand 314, which causes deflectors 200c and 200b to respectively move back to by-pass positions 200c' and 200b' ready for loading chickens into the next tier. Next, the operator closes switch 330 by pushing on the corresponding button ("Next level") which causes elevator means 186 to move loading conveyor means 118 to move to the next position, i.e., 118b, in position to load tier 172b in the same manner as previously described relative to the loading of tier 172a, and so on to the loading of the remainder of the tiers, 172b–172e. As the loading conveyor moves from one tier to the next, the doors 212 to the compartments of coop 110 are closed by arms 214. On the other hand arms 214 will not interfere with doors 212 when loading conveyor means 118 moves downwardly past the doors. It will be understood that loading conveyor means 118, if desired, can be moved to an uppermost position 118f above coop 110, as best seen in FIG. 14.

When coop 110 is loaded with chickens C, the operator closes switch 332 by pushing on the corresponding button ("Eject") which causes tilt cylinder 264 to be energized which slightly rotates carriage means 232 towards the loading position which allows the tension on locking pin 308 to be removed. After a short time delay the solenoid 335 that controls locking pin 308 is energized in reverse so that pin 308 is retracted. After retraction, tilt cylinder 264 is signaled to reverse so that carriage means 232 with coop 110 thereon is rotated back to a level position. At this time the coop 110 is resting against holding means 296. Therefore, air bags 250 are re-inflated and chain drive motors 244 move coop 110 up against limit switch 360 which moves the coop off of holding means 296. The solenoid 335 that controls cage ejecting cylinder means 266 is energized and the solenoid 335 that controls cage exit drive wheel motor 358 is energized after a time delay for venting of air bags 250 and lowering of the coop 110 onto rollers 237. Ejecting means 236 pushes coop 110 on towards the rear of apparatus 102 where the driven wheel 238 moves coop 110 to the off loading position where it hits a limit switch 360 which causes driven wheel 238 to stop and ejecting means 236 to retract out of the way. It should be pointed out that all of the switches corresponding to the buttons on wand 314, except switch 318 ("Freeze") are momentary and the programmable controller 312 takes care of all time delays and awaits the limit switch signals. Switch 318 is a single pole single throw type switch, which stays in one position until it is moved to the opposite position. Switch 318 when moved to a "freeze" position stops all power to the programmable controller 312 which causes all controller output to apparatus 102 to cease. Also, it should be pointed out three of the solenoids, namely solenoids 335, are dual solenoids which allows for reversal of all hydraulic motors and cylinders and pneumatic cylinders in the event that it becomes necessary to reverse a chain drive or air cylinder. This is a manual reversal which takes place from the control panel of controller 312.

Although the present invention has been described and illustrated with respect to a preferred embodiment and a preferred use therefor, and with respect to a modified embodiment and a preferred use thereof, it is not to be so limited since modifications and changes can be made therein which are within the full intended scope of the invention.

I claim:

1. An apparatus for gathering and cooping chickens into chicken coops of the type having a plurality of compartments arranged in a plurality of tiers, each tier having a plurality of side-by-side compartments, and each compartment having a door movable between open and closed positions, said apparatus including a loading area and said apparatus comprising:
   (a) a frame;
   (b) chicken gathering means supported from said frame for gathering chickens;
   (c) chicken coop handling means for receiving and maneuvering the chicken coops and for successively positioning the chicken coops into position at said loading area;
   (d) transporting means for receiving gathered chickens from said chicken gathering means and delivering the gathered chickens to said loading area; and
   (e) chicken loading means at said loading area for receiving chickens from said transporting means and for loading the chickens into the chicken coops, said chicken loading means including loading conveyer means, pivotally attached to said transporting means at said loading area, for receiving chickens from said transporting means and for reloading said loading conveyer means simultaneously during loading of the chickens into the chicken coops and without having to move said loading conveyer means to another location for reloading.

2. The apparatus of claim 1 in which said loading conveyer means includes:
   (a) a supporting framework and a receiving end for receiving chickens from said transporting means; and in which said chicken loading means additionally includes:
   (a) elevator means movably supporting said loading conveyer means from said frame for movement of said loading conveyer means into a plurality of stopped positions respectively adjacent the individual tiers of the chicken coop at said loading area and at each stopped position said loading conveyer means being adapted to move by the compartments in each tier; and
   (b) a plurality of deflector means attached to said supporting framework for respectively being positioned adjacent the compartments of the particular tier corresponding to the particular stopped position of the loading conveyer means for deflecting chickens into the desired compartment of the chicken coop at said loading area.

3. The apparatus of claim 2 in which said transporting means includes:
   (a) boom conveyor means having a receiving end for receiving chickens from said chicken gathering means and adapted to move chickens from said receiving end to a discharge end of said boom conveyor means; and
   (b) transfer means for receiving chickens from said boom conveyor means and for discharging chickens onto said loading conveyor means.

4. The apparatus of claim 3 in which said transfer means includes:
   (a) circular conveyor means for receiving chickens from the discharge end of said boom conveyor means and having a discharge opening, said circular conveyor being adapted to move chickens through said discharge opening of said circular conveyor means; and
   (b) transverse conveyor means having an upper end, having a receiving area for receiving chickens from said circular conveyor means, and having a discharge end, said transverse conveyor means being adapted to move chickens to said discharge end of said transverse conveyor means for discharge of chickens onto said loading conveyor means.

5. The apparatus of claim 4 in which is included guide means for said transverse conveyor means to guide the movement of the transverse conveyor means to keep said receiving area of said transverse conveyor means adjacent the discharge opening of said circular conveyor means and to keep the discharge end of said transverse conveyor means adjacent the receiving end of said loading conveyor means as said loading conveyor means is moved from a lowermost position adjacent the lowermost tier of a particular chicken coop being loaded to an uppermost position adjacent the uppermost tier of the particular chicken coop being loaded, said guide means including an upper end and a lower end.

6. The apparatus of claim 5 in which said guide means includes:
   (a) coupling means at said lower end of said guide means operably coupling said transfer means to said loading conveyor means; and
   (b) restraining means at said upper end of said guide means operably movably coupling said upper end of said transfer means and said frame for keeping said receiving area of said transverse conveyor means in cooperation with said coupling means adjacent the discharge opening of said circular conveyor means.

7. The apparatus of claim 1 in which said chicken coop handling means comprises:
   (a) first coop moving means disposed on one side of said apparatus, said first coop moving means including first roller means for movably supporting the coops for movement of the coops from a first position adjacent the rear of the apparatus to a second position forwardly of said first position;
   (b) first chain drive assembly means for successively transporting a coop that is resting thereon transversely of said apparatus from said second position towards an upright third position;

(c) first lifting means movable between a lowered position below said first chain drive assembly in which lowered position a coop rests on said first roller means and a raised position above said first roller means in which said first chain drive assembly means is raised above said first roller means so that the coops at said second position when said first lifting means is in said raised position will be transported transversely of said apparatus by said first chain drive assembly means towards said third position on the opposite side of said apparatus from said second position;

(d) second chain drive assembly means for successively receiving the coops being transported by said first chain drive assembly means and being adapted for successively transporting a coop into said third position when the coop is resting thereon and the second chain drive assembly means is in an operating mode;

(e) second coop moving means disposed on the opposite side of said apparatus from said first coop moving means including second roller means for movably supporting the coops after the loading thereof;

(f) second lifting means movable between a lowered position below said second chain drive assembly in which lowered position a coop is adapted to rest on said second roller means and a raised position above said second roller means in which said second chain drive assembly means is raised above said second roller means so that the coops received from said first chain drive assembly means will be successively transported transversely of said apparatus into said third position by said second chain drive assembly means;

(g) pivotable carriage means supporting said second chain drive assembly means and said second lifting means for receiving and supporting a coop in said upright third position when the coop is moved to said third position;

(h) tilting means operably coupled to said carriage means for movement of said carriage means and a coop supported thereby from the upright said third position to a tilted fourth position for loading the coop with chickens, and subsequently for movement of said carriage means and the loaded coop back to the upright said third position of the carriage means and the coop supported thereby for subsequent movement of said second lifting means into said lowered position thereof so that the lowered coop is resting on said second roller means; and (i) ejecting means for engaging the loaded coop when the carriage means and the loaded coop are moved back to the upright said third position and said second lifting means is moved to said lowered position for ejecting the loaded coop on said second roller means away from the carriage means towards the rearward end of the apparatus for removal of the loaded coop from the apparatus.

8. The apparatus of claim 7 in which said ejecting means includes cage eject cylinder means for engaging and urging the loaded coop towards the rearward end of the apparatus and cage drive wheel means for moving the loaded coop to the rearward end of the apparatus for subsequent removal from the apparatus.

* * * * *